US005563381A

United States Patent [19]
Crooks et al.

[11] Patent Number: 5,563,381
[45] Date of Patent: Oct. 8, 1996

[54] HANDWRITING CAPTURE SYSTEM WITH SEGMENTED DIGITIZER

[75] Inventors: John F. Crooks, Duluth; Robert L. Protheroe, Lawrenceville, both of Ga.

[73] Assignee: NCR Corporation, Dayton, Ohio

[21] Appl. No.: 400,733

[22] Filed: Apr. 17, 1995

Related U.S. Application Data

[63] Continuation of Ser. No. 80,278, Jun. 21, 1993.

[51] Int. Cl.⁶ .................................................. G08C 21/00
[52] U.S. Cl. ................................................ 178/18; 178/20
[58] Field of Search ....................... 178/18–20; 345/173, 345/174, 179, 156

[56] References Cited

U.S. PATENT DOCUMENTS

| | | | |
|---|---|---|---|
| 4,386,232 | 5/1983 | Slater | 178/18 |
| 4,492,818 | 1/1985 | Abe | 178/18 |
| 4,597,101 | 6/1986 | Kishimoto et al. | 382/13 |
| 4,625,075 | 11/1986 | Jaeger | 178/18 |
| 4,638,118 | 1/1987 | Wang et al. | 178/18 |
| 4,656,317 | 4/1987 | Tsugei et al. | 178/18 |
| 4,739,299 | 4/1988 | Eventoff et al. | 338/99 |
| 4,745,242 | 5/1988 | Koizumi et al. | 178/18 |
| 4,755,634 | 7/1988 | Pepper, Jr. | 178/18 |
| 4,801,771 | 1/1989 | Mizuguchi et al. | 200/86 R |
| 5,010,213 | 4/1991 | Moriwaki et al. | 178/18 |
| 5,045,643 | 9/1991 | Miyabayashi | 178/20 X |
| 5,049,862 | 9/1991 | Dao et al. | 345/179 |
| 5,149,918 | 9/1992 | Kozik et al. | 178/18 |
| 5,278,399 | 1/1994 | Sano | 178/18 X |
| 5,465,103 | 11/1995 | Yoshioka | 178/18 X |

*Primary Examiner*—Wellington Chin
*Assistant Examiner*—Paul Loomis
*Attorney, Agent, or Firm*—Paul W. Martin

[57] ABSTRACT

A handwriting capture system which includes a handwriting capture device containing a segmented digitizer. The handwriting capture device also includes circuitry which processes handwriting information entered into the segmented digitizer, a controller which determines position coordinates associated with the handwriting information, a memory coupled to the controller which stores position coordinates, and circuitry coupled between the controller and the segmented digitizer which drives and calibrates the segmented digitizer. The system also includes a host computer system coupled to the controller through an interface so that the controller can upload positional coordinates to the host system.

6 Claims, 19 Drawing Sheets

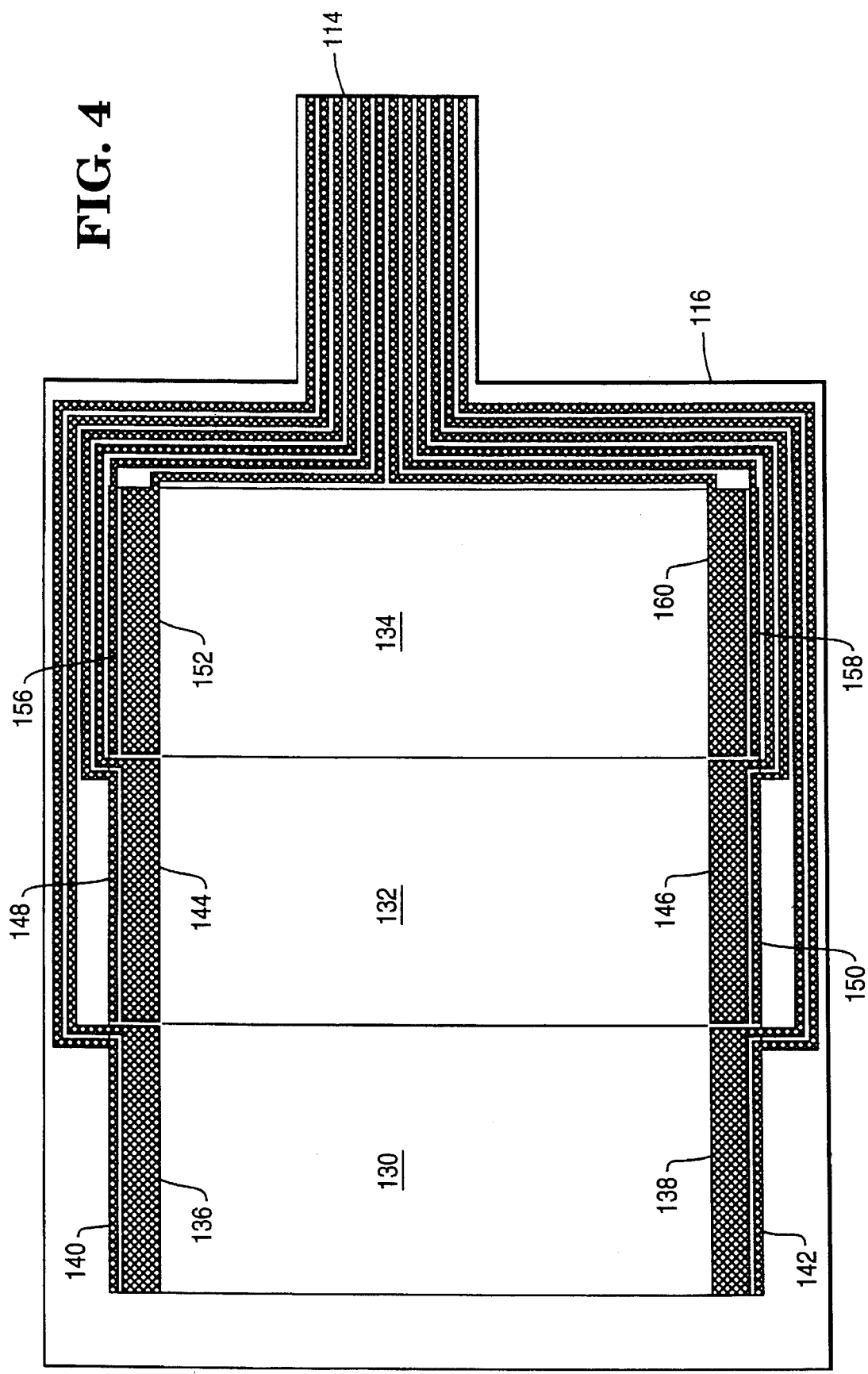

HANDWRITING CAPTURE SYSTEM WITH SEGMENTED DIGITIZER

This is a Continuation of application Ser. No. 08/080,278, filed Jun. 21, 1993.

CROSS REFERENCE TO RELATED APPLICATION

The present invention is related to the following commonly assigned U.S. Patent and co-pending U.S. patent applications:

"Method for Correcting Skew in a Transparent Digitizer", U.S. Pat. No. 5,115,107.

"Apparatus and Method for Digitizer Point Sampling and Validation", Ser. No. 07/838,984;

"Apparatus and Method for Digitizer Point Validation", Ser. No. 07/836,663; and

These documents are hereby incorporated by reference.

BACKGROUND OF THE INVENTION

The present invention relates to handwriting capture devices and more specifically to a handwriting capture system with a segmented digitizer.

An example of a conventional four-wire membrane digitizer is the Bradytouch digitizer panel from Dynapro Thin Films Division of Milwaukee, Wis. An example of a conventional five-wire membrane digitizer is the AccuTouch digitizer panel from Elographics of Oak Ridge, Tenn.

Conventional membrane digitizers are ideal in applications that require sensitivity to both stylus and finger, low cost, and a passive stylus. "Passive stylus" is one which has no electronics or moving parts.

Unfortunately, conventional membrane digitizers also has several drawbacks. Chief among them is its lack of "hand rejection", which is the ability to ignore a user's hand while the user is writing with a stylus. Touching the digitizer with a finger while writing with a stylus yields unpredictable digitizer data.

Two ways are known to reduce the hand rejection problem. One is to detect and then completely reject any points gathered while the user is touching with both a finger and a stylus. This method is useful in many situations, but it has the disadvantage that it cannot accurately digitize stylus position while the user is touching with a finger. The other prior art solution is to mechanically optimize the digitizer for only stylus actuation by making the spacer dots of the digitizer closer together. This solution is not acceptable in most situations because it requires an uncomfortably high stylus actuation force.

Therefore, it would be desirable to provide a handwriting capture system with a segmented digitizer which is largely immune to finger or hand contact.

SUMMARY OF THE INVENTION

In accordance with the teachings of the present invention, a handwriting capture system with a segmented digitizer is provided. The segmented digitizer is located within a handwriting capture device which also includes circuitry that processes handwriting information entered into the segmented digitizer, a controller which determines position coordinates associated with the handwriting information, a memory coupled to the controller which stores position coordinates, and circuitry coupled between the controller and the segmented digitizer which drives and calibrates the segmented digitizer. The system also includes a host computer system coupled to the controller through an interface so that the controller can upload positional coordinates to the host system.

It is a feature of the present invention that the digitizer includes separate drive and sense electrodes. This feature improves the operation of both segmented and non-segmented digitizers. The digitizer avoids error-inducing voltage drops by reading voltages at the dedicated voltage sense points instead of at the drive electrodes.

It is accordingly an object of the present invention to provide a handwriting capture system with a segmented digitizer.

It is another object of the present invention to provide a segmented digitizer.

It is another object of the present invention to provide a digitizer of improved construction, having separate sense and drive electrodes.

It is another object of the present invention to provide a method for determining handwriting position information using a segmented digitizer.

It is another object of the present invention to provide a method for automatically calibrating a segmented digitizer.

It is another object of the present invention to provide a method for determining multi-point actuation of a segmented digitizer.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 4 is a bottom view of the top layer of the segmented digitizer of FIG. 2;

DETAILED DESCRIPTION

Figure 1:
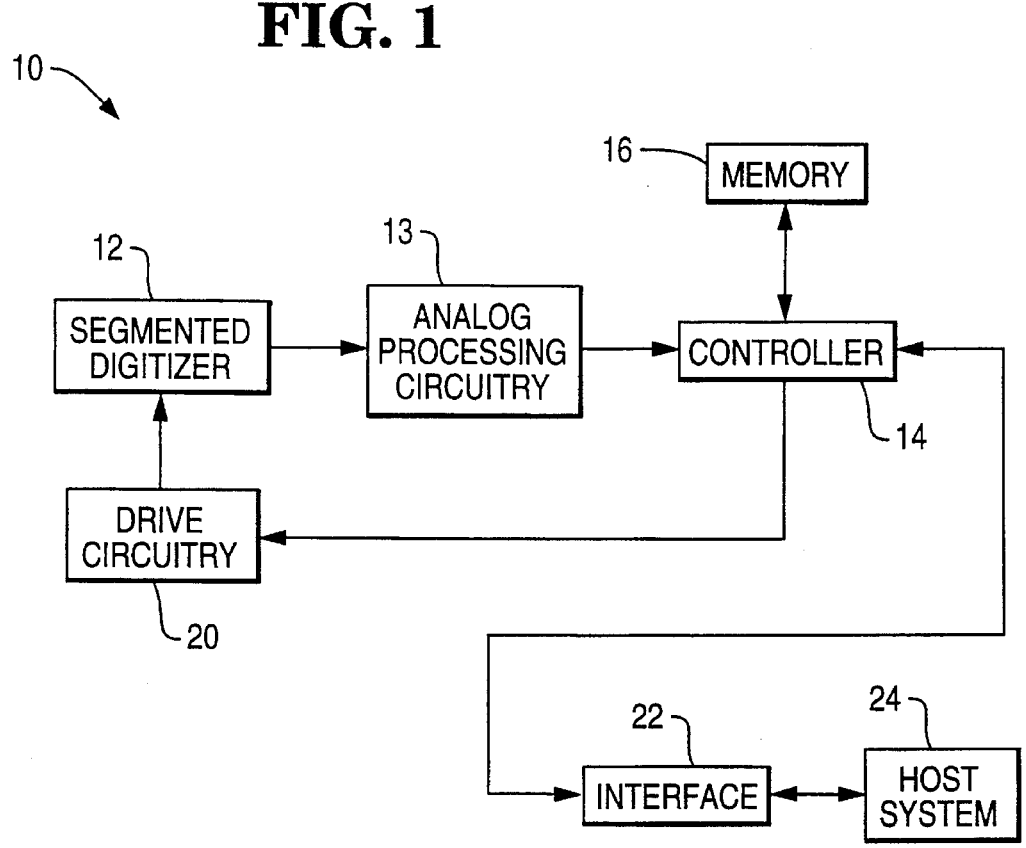
FIG. 1 is a block diagram of the handwriting capture system of the present invention.

Referring now to FIG. 1, handwriting capture system 10 primarily includes segmented digitizer 12, analog processing circuitry 13, controller 14, and memory 16. System 10 may also include drive circuitry 20, interface 22, and host system 24.

Segmented digitizer 12 provides a writing surface for producing analog signals in response to pressure applied by a stylus or other writing instrument. Preferably, segmented digitizer 12 is a four-wire resistive membrane digitizer having six segments, although other types of digitizers and numbers of segments are also envisioned by the present invention.

Analog processing circuitry 13 converts analog signals from each of the segments of segmented digitizer 12 into digital numbers.

Controller 14 converts the digital numbers into digital coordinates representative of the points on segmented digitizer 12 at which pressure has been applied.

Memory 16 stores several predetermined variables in a memory while controller 14 is determining digitized position.

Drive circuitry 20 energizes digitizer 12 and provides a mapping function between real and digitized position coordinates to minimize differences caused by offset, scale, skew, and distortion.

System 10 may also include drive circuitry 20, interface 22, and host system 24. Interface 22 provides a link between host system 24 and controller 14 for downloading handwriting information, such as signature information, and for uploading information, such as verification information. Preferably, interface 22 is an RS232 standard interface.

Host system 24 may be any personal computer, retail terminal, or network.

Figure 2A:
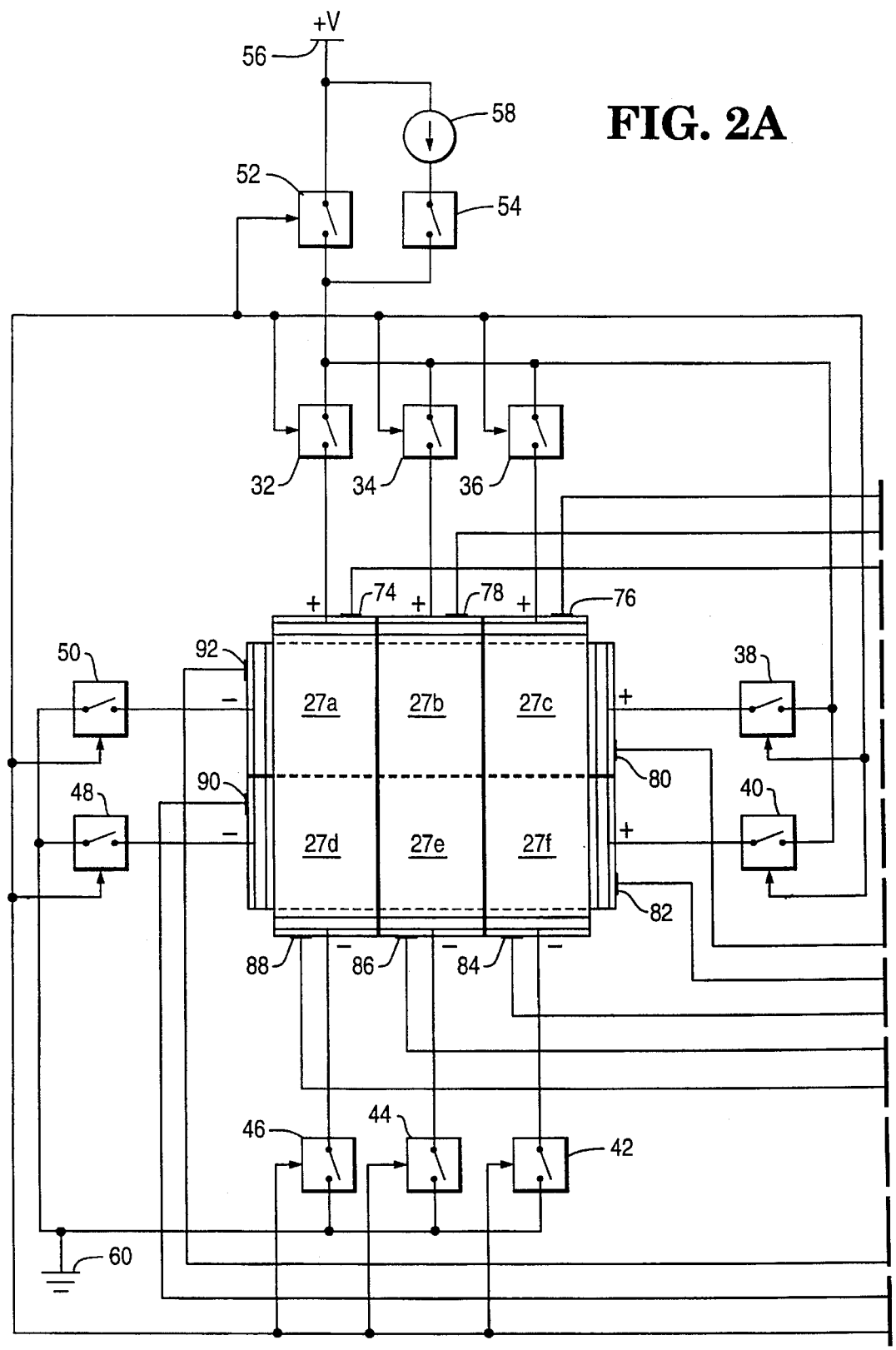
FIGS. 2A and 2B are a schematic diagram of the system of FIG. 1.
Figure 2B:
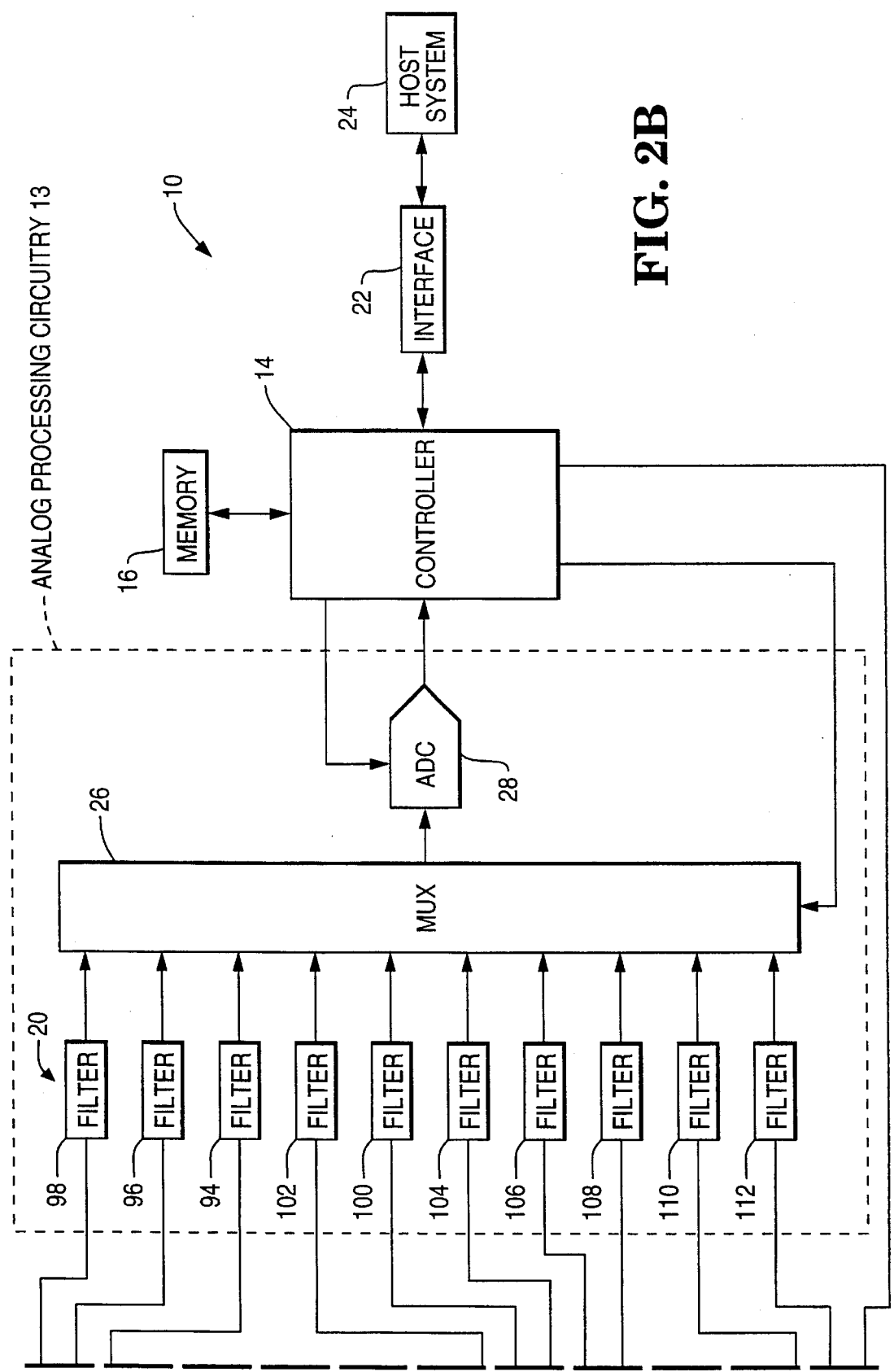

Turning now to FIGS. 2A and 2B, the system of FIG. 1 is shown in more detail. Analog processing circuitry 13 preferably includes multiplexer 26 and analog-to-digital (A/D) converter 28.

Multiplexer 26 multiplexes signals from each of the segments 27a–f of segmented digitizer 12 so that a single A/D converter 28 may be employed to reduce cost. Multiplexer 26 is preferably a standard digitally controlled, single pole, ten throw analog switch.

A/D converter 28 converts the analog signals from each of the segments into digital numbers. A/D converter 28 may be part of the same integrated circuit chip containing controller 14.

Controller 14 also provides a switching function for multiplexer 26 and controls operation of A/D converter 28 and drive circuitry 20. Controller 14 may be a 80198 microcontroller available from the Intel Corporation of Santa Clara, Calif.

Drive circuitry 20 includes analog switches 32–54, which apply either a voltage source 56, constant current source 58, or electrical ground 60 to various combinations of digitizer segments 27a–f in accordance with instructions from controller 14. Analog switches 32–54 are standard single pole, single throw, digitally controlled analog switches.

Controller 14 reads the voltages at voltage sense points 74 through 92 through multiplexer 26 and A/D converter 28. Voltage sense points 74–92 provide an accurate reading of the voltages on segments 27a–f directly below their respective electrodes so that touch positions may be more accurately determined.

Conventional four wire membrane systems measure the voltage at each electrode. However, there is typically a substantial resistance along the electrode itself as well as between the electrode and the ITO coating. This resistance creates a voltage drop whenever the measured electrode carries current. This voltage drop introduces errors. The dedicated voltage sense points 74–92 bypass this voltage drop by reading the voltage directly at the ITO coating. The conventional method of measuring the voltage at each electrode could also be employed with decreased accuracy.

Analog processing circuitry 13 also includes filters 94–112, which remove any electrical noise that might be present at voltage sense points 74–92 and multiplexer 26. Filters 94–112 may be standard first order filters.

Figure 3:
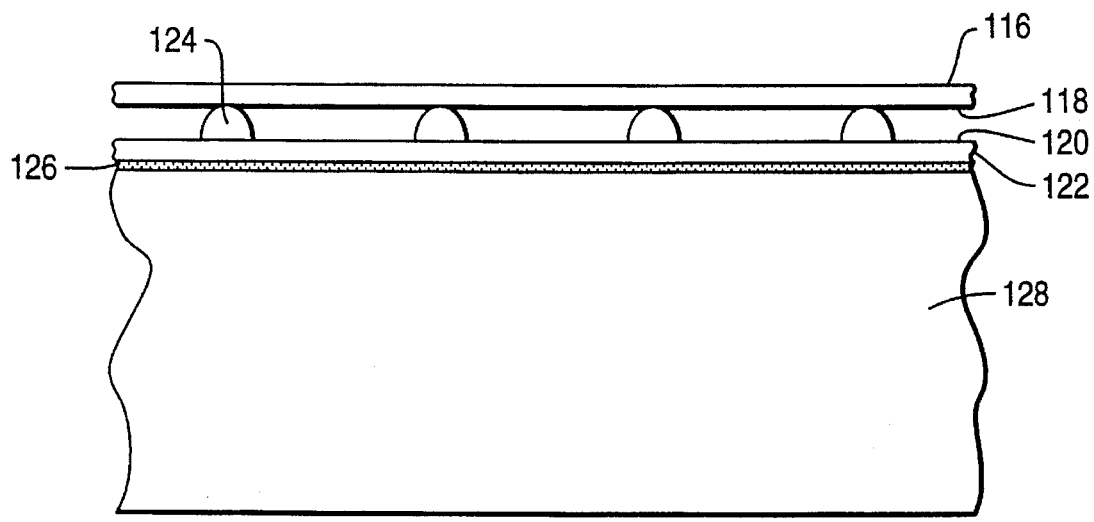
FIG. 3 is a cross-sectional view of the segmented digitizer of FIGS. 2A, 2B, 11A, and 11B.
Figure 5:
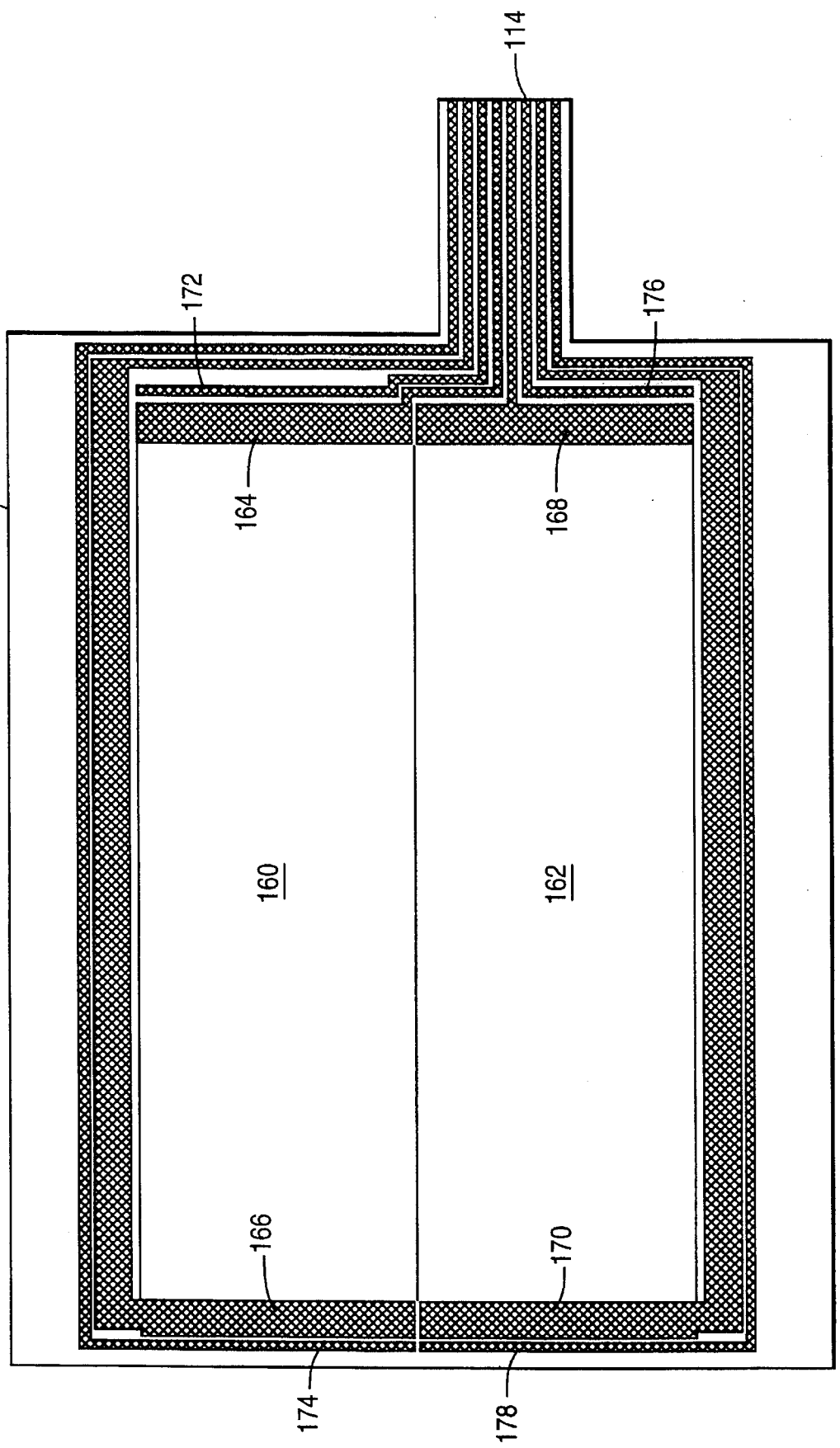
FIG. 5 is a top view of the bottom layer of the segmented digitizer of FIG. 2.

Turning now to FIGS. 3–5, segmented digitizer 12 is shown as a segmented four wire membrane digitizer, although other geometries are also envisioned by the present invention. Digitizer 12 includes several layers of polyester and adhesive attached to a rigid substrate. Conductors are silk-screened with silver ink, while the various surfaces of digitizer 12 is are coated with indium tin oxide (ITO), a transparent conductor. Digitizer 12 connects to other components of circuit 10 via a flat flex connector tail 114 (FIGS. 4 and 5).

With reference to FIG. 3, polyester top layer 116 includes an ITO coating on bottom surface 118. Top surface 120 of bottom layer 122 also includes an ITO coating. Spacer dots 124 keep the ITO coatings on surfaces 118 and 120 from making electrical contact with each other until a user writes on or touches top layer 116. The amount of pressure required to make electrical contact increases as the distance between spacer dots 124 decreases. Spacer dots 124 are typically silk-screened epoxy paint. Adhesive layer 126 connects bottom layer 122 to substrate 128. Substrate 128 is typically glass.

With reference to FIG. 4, top layer 116 includes vertical ITO strips 130–134. Electrode pair 136 and 138 and voltage sense points 140 and 142 couple to ITO strip 130. Electrode pair 144 and 146 and voltage sense points 148 and 150 couple to ITO strip 132. Finally, electrode pair 152 and 160 and voltage sense points 156 and 158 couple to ITO strip 134.

With reference to FIG. 5, bottom layer 122 is shown in more detail. Bottom layer 122 includes horizontal ITO strips 160 and 162 and associated electrode pairs 164 and 166, and 168 and 170. Voltage sense points 172 and 174 couple to ITO strip 160, while sense points 176 and 178 couple to ITO strip 162.

With reference again to FIGS. 4 and 5, placement of top layer 116 over bottom layer 122 effectively creates six separate writing areas corresponding to segments 27a–f. In general, segmented digitizer 12 may include m vertical ITO strips and n horizontal ITO strips to yield a digitizer having the product m times n segments.

Each of segments 27a–f of segmented digitizer 12 are individually decoded. They operate independently of each other. This enhancement over conventional unsegmented digitizers improves the digitizer's ability to detect handwritten data at the same time the user is touching with a hand or finger. It improves hand rejection and allows the digitizer to individually determine the positions of two or more objects touching the digitizer at the same time.

Figure 6:
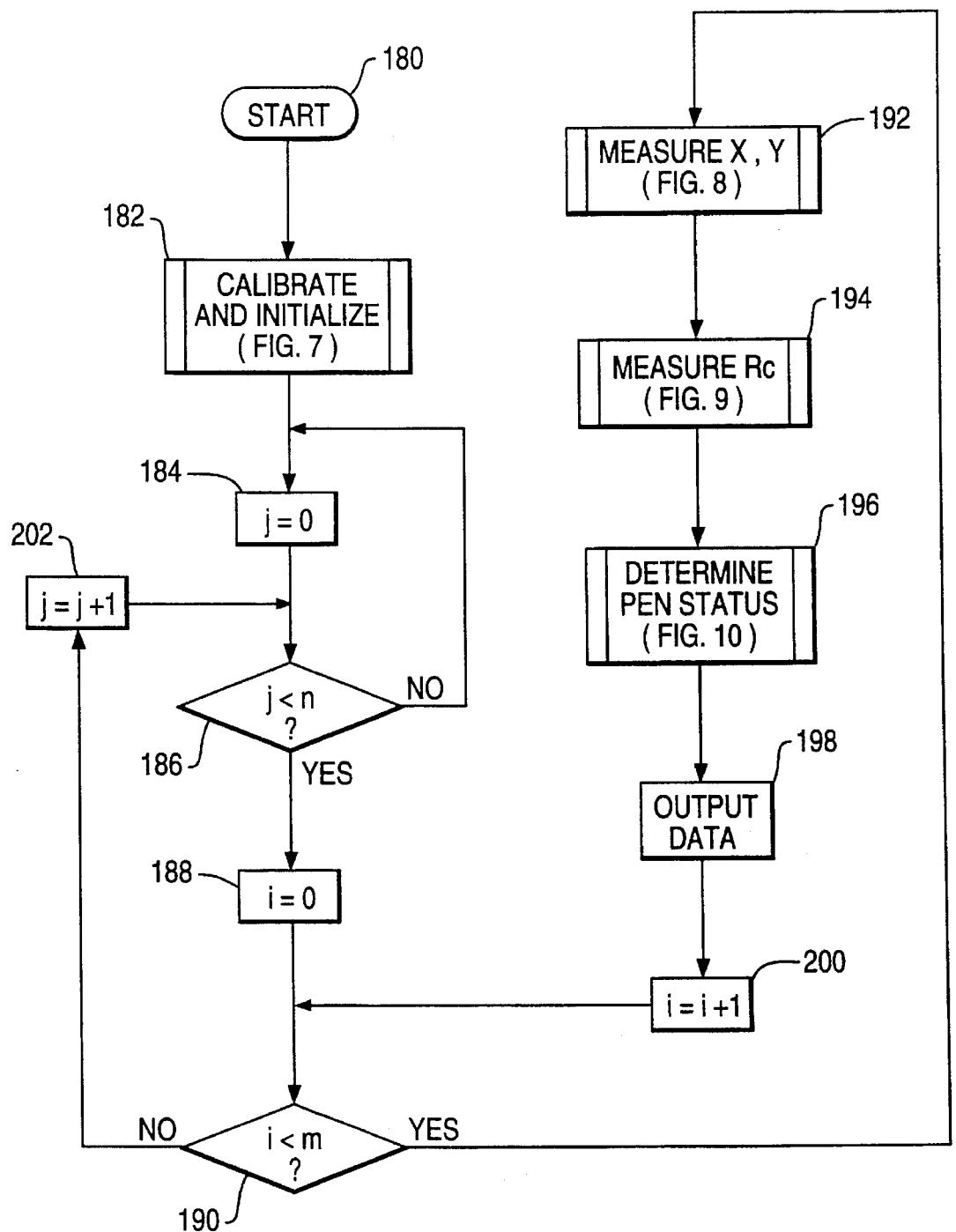
FIG. 6 is a flow diagram of a method for determining the coordinates of a point of contact on the surface of the segmented digitizer.

Turning now to FIG. 6, a method for determining touch position is disclosed, beginning with START 180. In order to illustrate the general case of an m by n digitizer, the vertical ITO strips are labeled Y0, Y1, Y2, . . . , Ym, starting from the left side of digitizer 12. The horizontal ITO strips are labeled X0, X1, . . . , Xn, starting from the bottom side of digitizer 12. The left and bottom sides of each ITO strip are referred to as the "−" or "negative" sides, while the top and right sides of each ITO strip are referred to as the "+" or "positive" sides.

Thus, in block 182 controller 14 performs a calibration and initialization step. Controller 14 then steps through each segment intersection of the digitizer and determines position, contact resistance, and pen status. It does this by first initializing count variable j to 0 in step 184.

In step 186, controller 14 determines whether count variable j is less than horizontal constant n. If count variable j is not less than horizontal constant n, the procedure returns to step 184. Otherwise, the procedure continues to step 188 where controller 14 sets count variable i to zero.

Controller 14 then determines whether count variable i is less than vertical constant m in step 190. If count variable i is not less than vertical constant m, then the procedure branches to step 202, where count variable j is incremented by one and the procedure continues at step 186. Otherwise, operation continues to step 192.

In step 192, controller 14 measures position.

In step 194, controller 14 measures contact resistance Rc at the point of actuation.

Using contact resistance Rc and the positional data, controller 14 determines whether the writing instrument is up, down, or in a multipoint condition in step 196.

In step 198, controller 14 outputs contact resistance Rc, pen status, and position to host system 24 via interface 22.

Finally, controller 14 increments count variable i in step 200 and returns to step 190.

Figure 7:
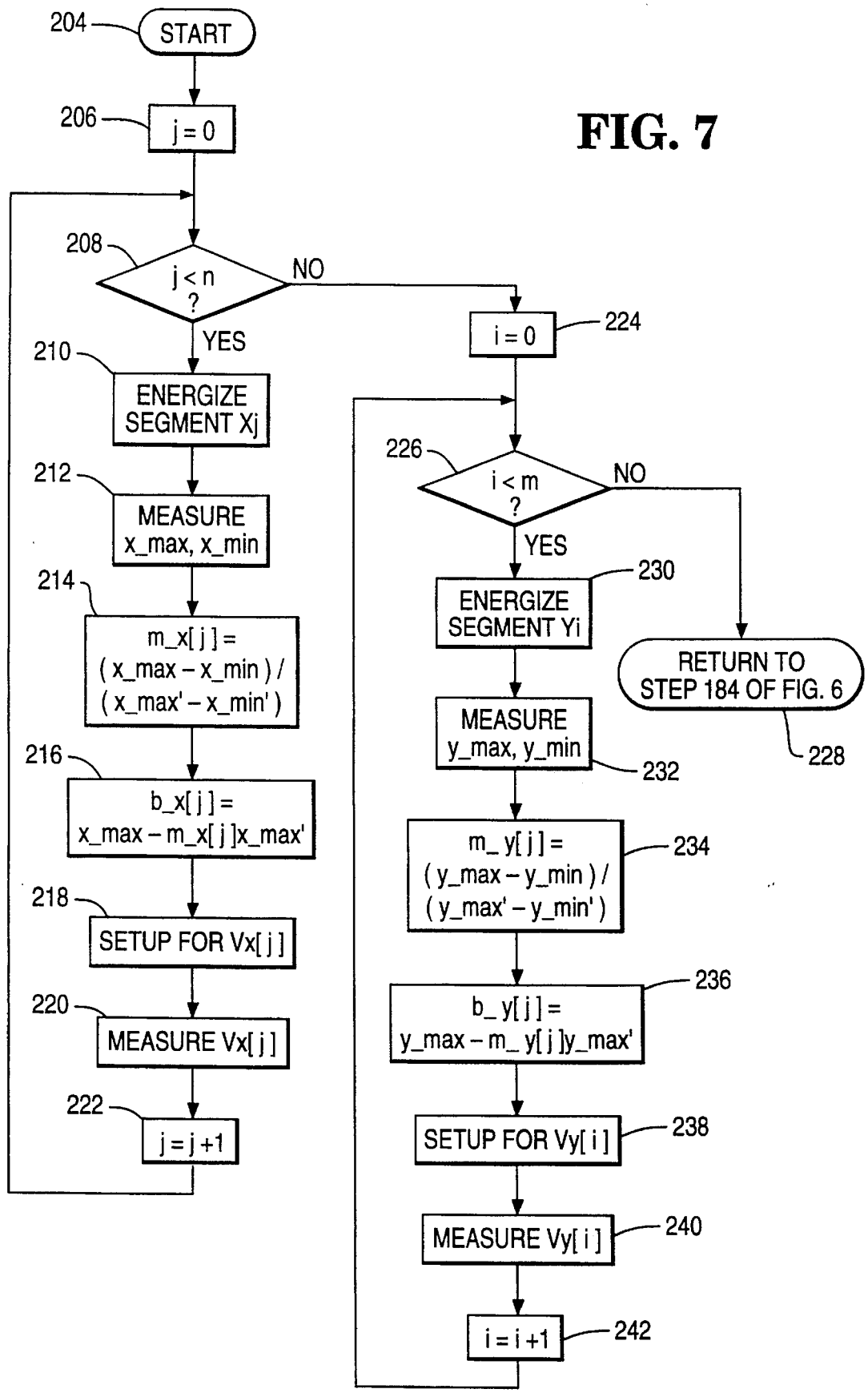
FIG. 7 is a flow diagram of a method for initializing and calibrating the segmented digitizer.

Turning now to FIG. 7, the calibration and initialization step 182 from FIG. 6 is shown in more detail, beginning with START 204. Briefly, calibration means creating a mapping function between real world and digitized positional coordinates. Real world coordinates represent actual physical locations, while digitizer coordinates represent real world coordinates as measured by the digitizer.

The calibration mapping function ideally corrects for four types of differences between real world and digitizer coordinate systems: offset, scale, skew, and distortion. Offset is caused by a misalignment of absolute origins between real world and digitizer coordinate systems, while scale is caused by different distances per coordinate count between the two coordinate systems. Skew is caused by an apparent rotation between the two coordinate systems, and distortion is caused by nonlinearities in the digitizer sampling function.

Many different factors can cause these differences between coordinate systems: misalignment of the digitizer sensing elements with respect to their mechanical mounts, imperfections in the digitizer electronics, and nonlinearities in the digitizer panel ITO conductive coatings.

Calibration is especially important in a segmented digitizer. Controller 14 individually calibrates each segment. If the calibration mapping function is not accurate from segment to segment, there will be an apparent discontinuity in the digitized positional coordinates when a stylus or finger crosses from one segment to another.

Conventional calibration methods require manual intervention, either touching the digitizer at several calibration points or adjusting one or more potentiometers. This is labor intensive and subject to human error. Such methods often require nonvolatile memory to save factory calibration settings, and this adds cost and complexity. Also, digitizer characteristics can change with age, requiring periodic recalibration.

The calibration mapping functions for the segmented four wire membrane digitizer are of the form:

$$x = m\_x \, x' + b\_x \quad (1)$$

$$y = m\_y \, y' + b\_y \quad (2)$$

where x, y are corrected digitizer coordinates in real world coordinate units, x',y' are uncorrected digitizer coordinates, $m\_x$, $m\_y$ are scale constants, and $b\_x$, $b\_y$ are offset constants.

Mapping functions (1) and (2) above are simplified forms of the equations originally presented in the earlier mentioned U.S. Pat. No. 5,115,107. These simplified forms only correct for scale and offset errors. For the remainder of the calculations, the following definitions apply:

x_max is the real world x-location of the positive end of ITO strip Xj, x_max' is the digitized x-location of the positive end of ITO strip Xj, y_max is the real world y-location of the positive end of ITO strip Yi, y_max' is the digitized y-location of the positive end of ITO strip Yi, x_min is the real world x-location of the negative end of ITO strip Xj, x_min' is the digitized x-location of the negative end of ITO strip Xj, y_min is the real world y-location of the negative end of ITO strip Yi, and y_min' is the digitized y-location of the negative end of ITO strip Yi.

Substituting these quantities into the mapping equations, one obtains two sets of two simultaneous equations:

$$x\_max = m\_x \, x\_max' + b\_x \quad (3)$$

$$x\_min = m\_x \, x\_min' + b\_x \quad (4)$$

$$y\_max = m\_y \, y\_max' + b\_y \quad (5)$$

$$y\_min = m\_y \, y\_min' + b\_y \quad (6)$$

Simultaneously solving equations 3, 4, 5, and 6, one can show that:

$$m\_x = (x\_max - x\_min)/(x\_max' - x\_min') \quad (7)$$

$$b\_x = x\_max - m\_x \, x\_max' \quad (8)$$

$$m\_y = (y\_max - y\_min)/(y\_max' - y\_min') \quad (9)$$

$$b\_y = y\_max - m\_y \, y\_max' \quad (10)$$

Controller 14 uses equations 7, 8, 9, and 10 to calculate constants $m\_x$, $m\_y$, $b\_x$, and $b\_y$.

The actual values of x_max, x_min, y_max, and y_min depend on the digitizer geometry and application. As an example, assume the distance between the positive and negative end electrodes of ITO strip Xj is 5" while the distance between the positive and negative end electrodes of ITO strip Yj is 4". Also assume the resulting coordinate values need to be in units of 0.005" starting at zero in the lower left hand corner of the digitizer. x_min and y_min would then be zero, while x_max would be 5"÷0.005"= 1000 and y_max would be 4"÷0.005"=800.

In the calibration procedure of FIG. 7, controller 14 automatically calibrates digitizer 12 for accuracy and also takes several baseline readings required to calculate contact resistance Rc in later steps of FIG. 6.

Returning to FIG. 7, controller 14 initializes the index variable j to zero in step 206.

In step 208, controller 14 determines whether count variable j is less than horizontal constant n. If count variable j is less than horizontal constant n, controller 14 continues to step 210 where it energizes ITO strip Xj. This means applying voltage source 56 to the positive end of the segment and ground 60 to the negative end of the segment. For ITO strip X0 (ITO strip 162), controller 14 would do this by closing analog switches 48, 40, and 52 while leaving all other switches open. If count variable j is not less than horizontal constant n, then the method proceeds to step 224.

In step 212, controller 14 measures the quantities x_max' and x_min' at the positive and negative ends of the energized ITO strip Xj. As an example, for ITO strip X0 (ITO strip 162), controller 14 selects voltage sense point 82 through multiplexer 26, reads x_max' from A/D converter 28, selects voltage sense point 90 through multiplexer 26, and then reads x_min' from A/D converter 28.

In step 214, controller 14 calculates the scalar constant m_x[j] using equation (7) above. Scalar matrix m_x[] is an n-long array for storing the m_x scalar constants for each Xj electrode. Similarly, controller 14 calculates the offset constant b_x[j] in step 216 using equation (8) above.

In step 218, controller 14 sets up to read voltage Vx[j] and then takes the actual reading in step 220. Controller 14 requires voltage Vx to calculate contact resistance Rc. To measure voltage Vx[j], controller 14 measures the voltage required to inject a constant current into the positive end of the segment Xj while grounding the negative end. For ITO strip X0 (ITO strip 162), controller 14 closes analog switches 40, 48, and 54 while leaving all other switches open. Controller 14 then selects voltage sense point 82 through multiplexer 26 and measures voltage Vx[0] at A/D converter 28.

In step 222, controller 14 increments count variable j by one and then returns to step 208.

Returning to step 208, if count variable j is not less than horizontal constant n, operation continues to step 224 where controller 14 sets count variable i to 0.

In step 226, controller 14 determines whether count variable i is less than vertical constant m. If count variable i is less than vertical constant m, the procedure continues to step 230 where controller 14 energizes ITO strip Yi. For ITO strip Y0 (ITO strip 130) controller 14 closes analog switches 32, 46, and 52 while leaving all other switches open.

In step 232, controller 14 measures the quantities y_max and y_min at the positive and negative ends respectively of the energized ITO strip Yi. For ITO strip Y0 (ITO strip 130), controller 14 selects voltage sense point 74 through multiplexer 26, reads y_max from A/D converter 28, selects voltage sense point 88 through multiplexer 26, and reads y_min from A/D converter 28.

In step 234, controller 14 calculates the scalar constant m_y[i] using equation (9) above. Similarly, controller 14 calculates the offset constant b_y[i] in step 236 using equation (10) above.

Controller 14 sets up to read voltage Vy[i] in step 238 and makes the actual reading in step 240. Controller 14 requires voltage Vy to calculate contact resistance Rc. To measure voltage Vy[i], controller 14 measures the voltage required to inject a constant current into the positive end of the segment Yi while grounding the negative end. For ITO strip Y0 (ITO strip 130), controller 14 closes analog switches 32, 46, and 54 while leaving all other switches open. Controller 14 then selects voltage sense point 74 through multiplexer 26 and measures voltage Vy[0] at A/D converter 28.

In step 242, controller 14 increments count variable i by one and returns to step 226.

At step 226, if count variable i is not less than vertical constant m, controller 14 is finished initializing and calibrating and proceeds to step 184 of FIG. 6 via step 228.

Figure 8:
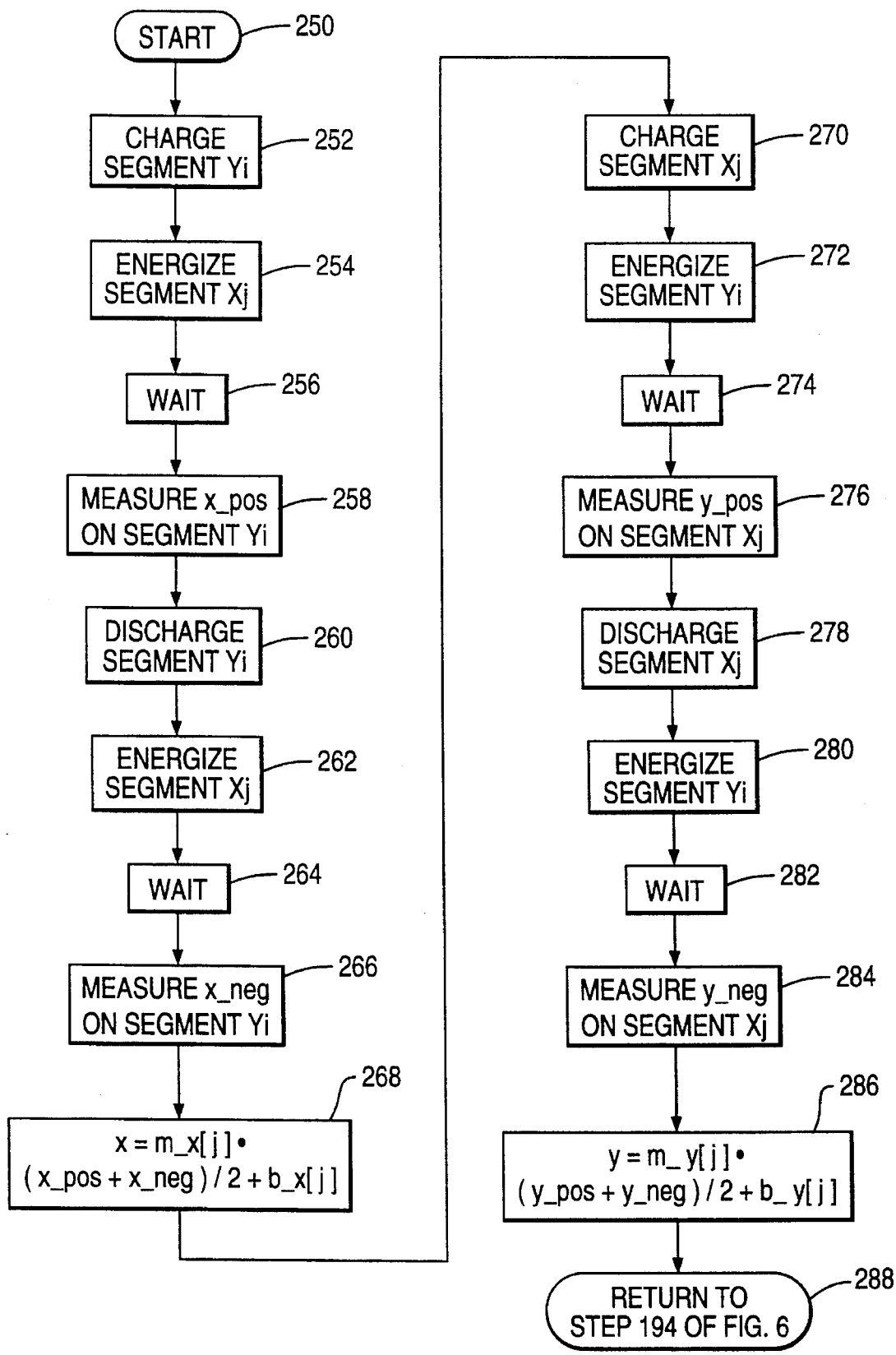
FIG. 8 is a flow diagram of a method for determining contact position.

Turning now to FIG. 8, the "Measure X, Y" step 192 of FIG. 6 is explained in more detail, beginning with START 250.

In step 252, controller 14 charges the ITO strip Yi by charging the digitizer as well as the low pass filters for segment Yi to voltage source 56. For Y0 (ITO strip 130), controller 14 closes switches 32 and 52 for a short period of time while leaving all other switches open.

In step 254, controller 14 energizes segment Xj.

In step 256, controller 14 waits for the opposite layer segment Yi to discharge to the positional voltage at the point of actuation.

In step 258, controller 14 measures the temporary quantity x_pos at segment Yi. For Y0 (ITO strip 130), controller 14 selects voltage sense point 74 and measure x_pos at A/D converter 28.

In step 260, controller 14 discharges segment Yi by discharging the digitizer as well as the low pass filter for ITO strip Yi. For Y0 (ITO strip 130), controller 14 closes switch 46 for a short period of time while leaving all other switches open.

In step 262, controller 14 energizes ITO strip Xj.

In step 264, controller 14 waits, just as in the previous step 256.

In step 266, controller 14 measures x_neg in exactly the same way it measured x_pos in step 258.

In step 268, controller 14 calculates position by applying the calibration mapping function (equation (1) above) to the average of x_pos and x_neg. The exact equation is $$x = m\_x[j](x\_pos + x\_neg) \div 2 + b\_x[j].$$

In step 270, controller 14 charges ITO strip Xj by connecting ITO strip Xj and associated low pass filters to voltage source 56. For ITO strip X0 (ITO strip 14), controller 14 closes switches 40 and 52 for a short period of time while leaving all other switches open.

In step 272, controller 14 energizes segment Yi just as in step 230 of FIG. 7.

Controller 14 waits for the opposite layer segment Xj to discharge to the positional voltage at the point of actuation in step 274.

In step 276, controller 14 measures the temporary quantity y_pos at segment Xj. For ITO strip X0 (ITO strip 130), controller 14 selects voltage sense point 82 through multiplexer 26 and measures y_pos at A/D converter 28.

In step 278, controller 14 discharges segment Xj to ground 60. For ITO strip X0 (ITO strip 68), controller 14 closes switch 48 for a short period of time while leaving all other switches open.

Controller 14 then energizes segment Yi in step 280 and waits in step 282, just as in the previous steps 272 and 274.

Controller 14 measures y_neg in step 284 in exactly the same way it measured y_pos in step 276.

In step 286, controller 14 calculates position by applying the calibration mapping function (equation (2)) to the average of y_pos and y_neg using the equation $$y = m\_y[i](y\_pos + y\_neg) \div 2 + b\_y[i].$$

Finally, in step 288, the procedure ends by returning to step 194 of FIG. 6.

Figure 9:
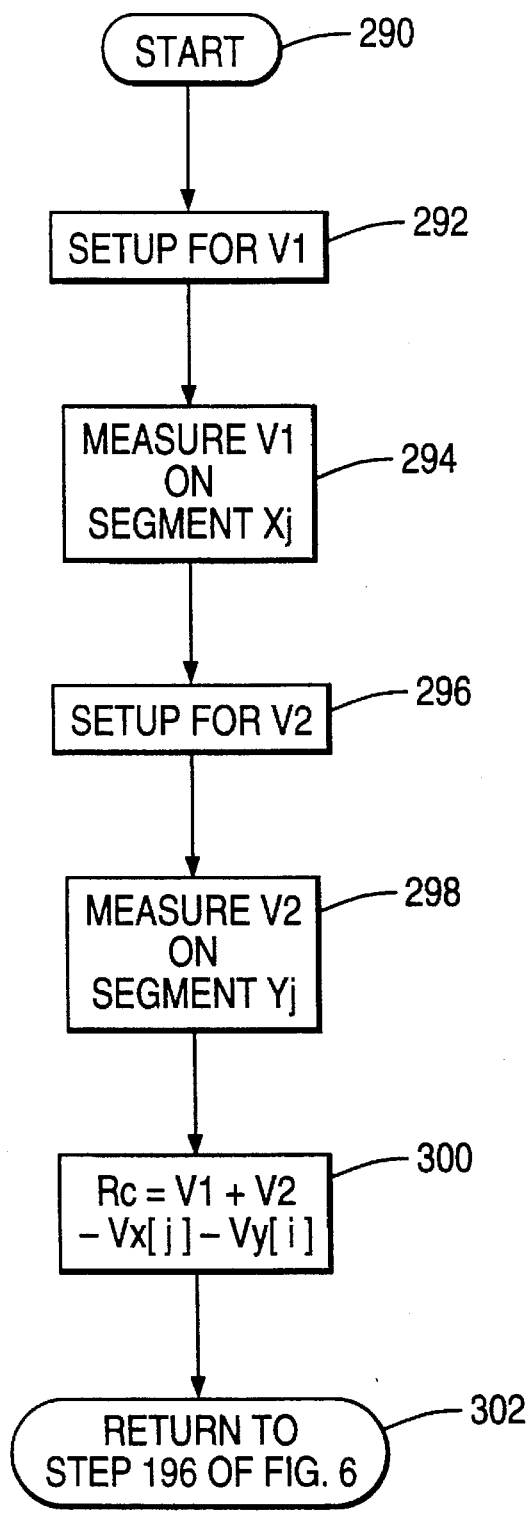
FIG. 9 is a flow diagram of a method for determining contact resistance.

Turning now to FIG. 9, the method of determining contact resistance Rc is discussed in detail, beginning with START 290. Contact resistance Rc is the resistance between the two conductive layers 118 and 120 at the point of actuation exclusive of the resistance of the layers themselves.

In step 292, controller 14 sets up to measure V1 for the segment pair Xj, Yi. Controller 14 measures the voltage V1 required to drive a constant current into segment Xj, through the contact resistance Rc at the point of actuation, into ITO strip Yi, and back to ground 60. For the segment pair X0 (ITO strip 14), Y0 (ITO strip 130), controller 14 closes switches 32, 48, and 54 while leaving all other switches open.

In step 294, controller 14 reads voltage V1 at the positive end of segment Xj. For segment pair X0 (ITO strip 14), Y0 (ITO strip 130), controller 14 reads voltage point 74 through multiplexer 26 and A/D converter 28.

In step 296, controller 14 sets up to read voltage V2 for the segment pair Xj, Yi. Controller 14 measures the voltage required to drive a constant current into segment Yi, through the contact resistance Rc at the point of actuation, into segment Xj, and then into ground 60. For segment pair X0 (ITO strip 14), Y0 (ITO strip 130), controller 14 closes switches 40, 46, and 54 while leaving all other switches open.

In step 298, controller 14 reads voltage V2 at the positive end of segment Yi. For segment pair X0 (ITO strip 14), Y0 (ITO strip 130), controller 14 selects voltage sense point 82 through multiplexer 26 and A/D converter 28.

In step 300, controller 14 calculates contact resistance from the equation:

$$Rc = V1 + V2 - Vx[j] - Vy[i].$$

In step 302, the procedure returns to step 196 of FIG. 6.

Figure 10:
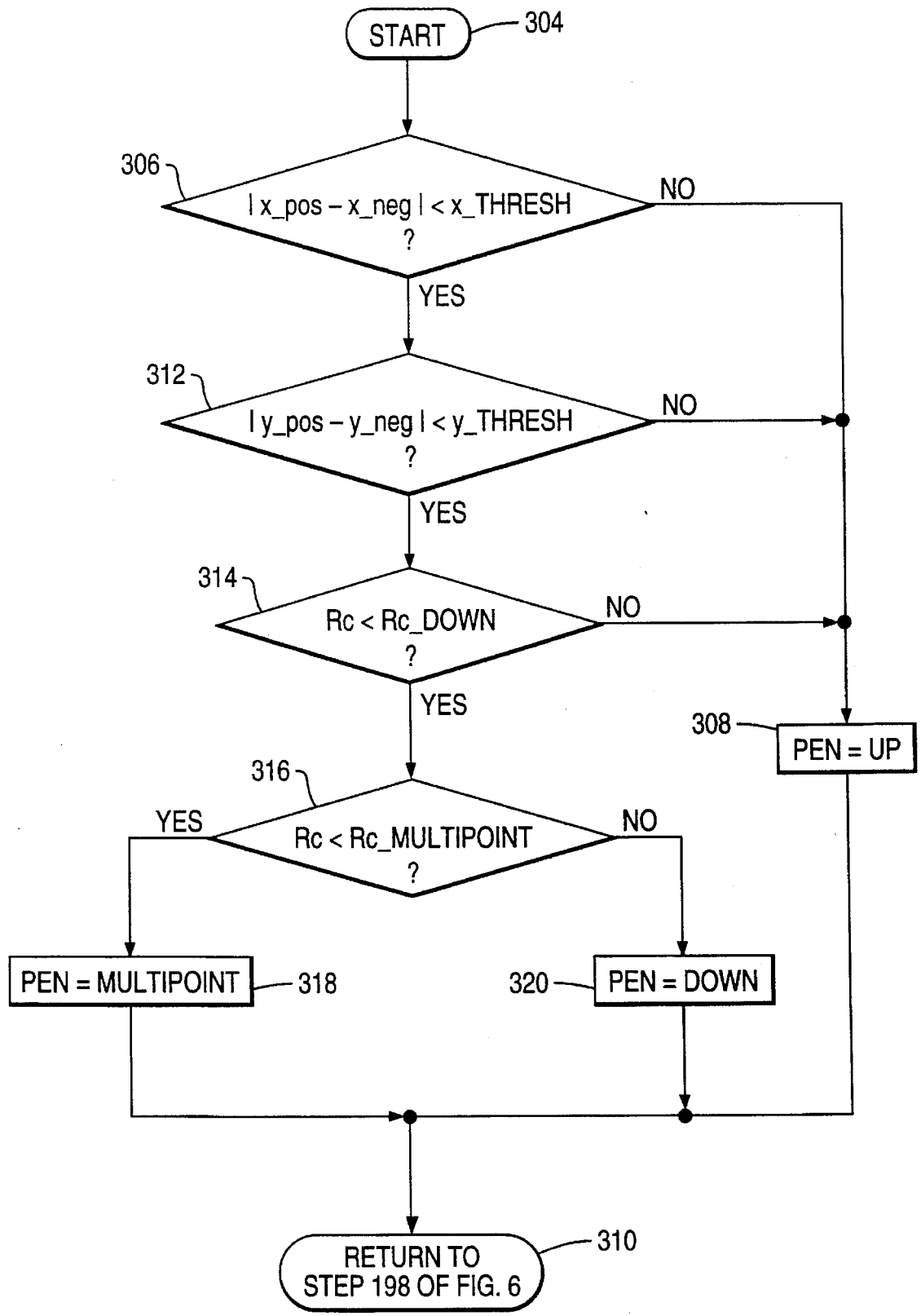
FIG. 10 is a flow diagram of a method for determining pen status.

Turning now to FIG. 10, the method of determining pen status is explained in detail, beginning with START 304. Controller 14 determines pen status according to a combination of Rc, x_pos, x_neg, y_pos, and y_neg.

In step 306, controller 14 determines whether the absolute value of the difference between x_pos and x_neg is less than x_thresh, where x_thresh is a threshold constant typically on the order of four counts for a 10-bit A/D converter 28. If decision step 306 is not true, then the x coordinate is not stable and operation continues to step 308 where controller 14 sets the pen status to UP, meaning a stylus or finger is not contacting digitizer 12. After step 308, operation returns in step 310 to step 198 of FIG. 6.

Returning to step 306, if the absolute value of x_pos minus x_neg is less than x_thresh, the procedure continues to step 312 where controller 14 determines whether the absolute value of y_pos minus y_neg is less than y_thresh. Again, y_thresh is a threshold constant typically on the order of four counts for a 10-bit A/D converter 28. If this is not true, the y coordinate is not stable and execution continues at step 308. Otherwise, execution continues to step 314 where controller 14 determines whether contact resistance Rc is less than threshold constant Rc_down. Threshold constant Rc_down is typically on the order of 90% of the full scale contact resistance Rc reading.

If contact resistance Rc is not less than threshold constant Rc_down, then execution continues to step 308. Otherwise, execution continues to step 316 where controller 14 determines whether contact resistance Rc is less than threshold constant Rc_multipoint. Rc_multipoint is typically on the order of 10% of the full scale contact resistance Rc reading.

If contact resistance Rc is less than threshold constant Rc_multipoint, then execution continues to step 318 where controller 14 sets the pen status to MULTIPOINT. This means that the user is touching digitizer 12 with a finger.

Returning to step 316, if contact resistance Rc is not less than threshold constant Rc_multipoint, controller 14 sets the pen status to DOWN in step 320. This means that only the stylus is actuating digitizer 12. In either case 318 or 320, execution continues to step 310 where the procedure returns to step 198 of FIG. 6.

Advantageously, system 10 and segmented digitizer 12 of the present invention solve the problems associated with conventional four wire membrane digitizers while adding the extra feature of multipoint detection. Multipoint detection means that segmented digitizer 12 can not only track a writing instrument, such as a stylus, while the user is touching with a finger, but can individually determine the positions of two or more objects touching digitizer 12 at the same time. This feature could be used to emulate a mouse button function in one area of the digitizer 12 while emulating a mouse position function in another area.

Another benefit of segmented digitizer 12 is decreased power consumption. Dividing the digitizer into segments increases its effective resistance. The higher the resistance, the lower the current required to drive it, and the less power it consumes. Decreased power consumption is important in today's battery powered handwriting capture devices.

Figure 11A:
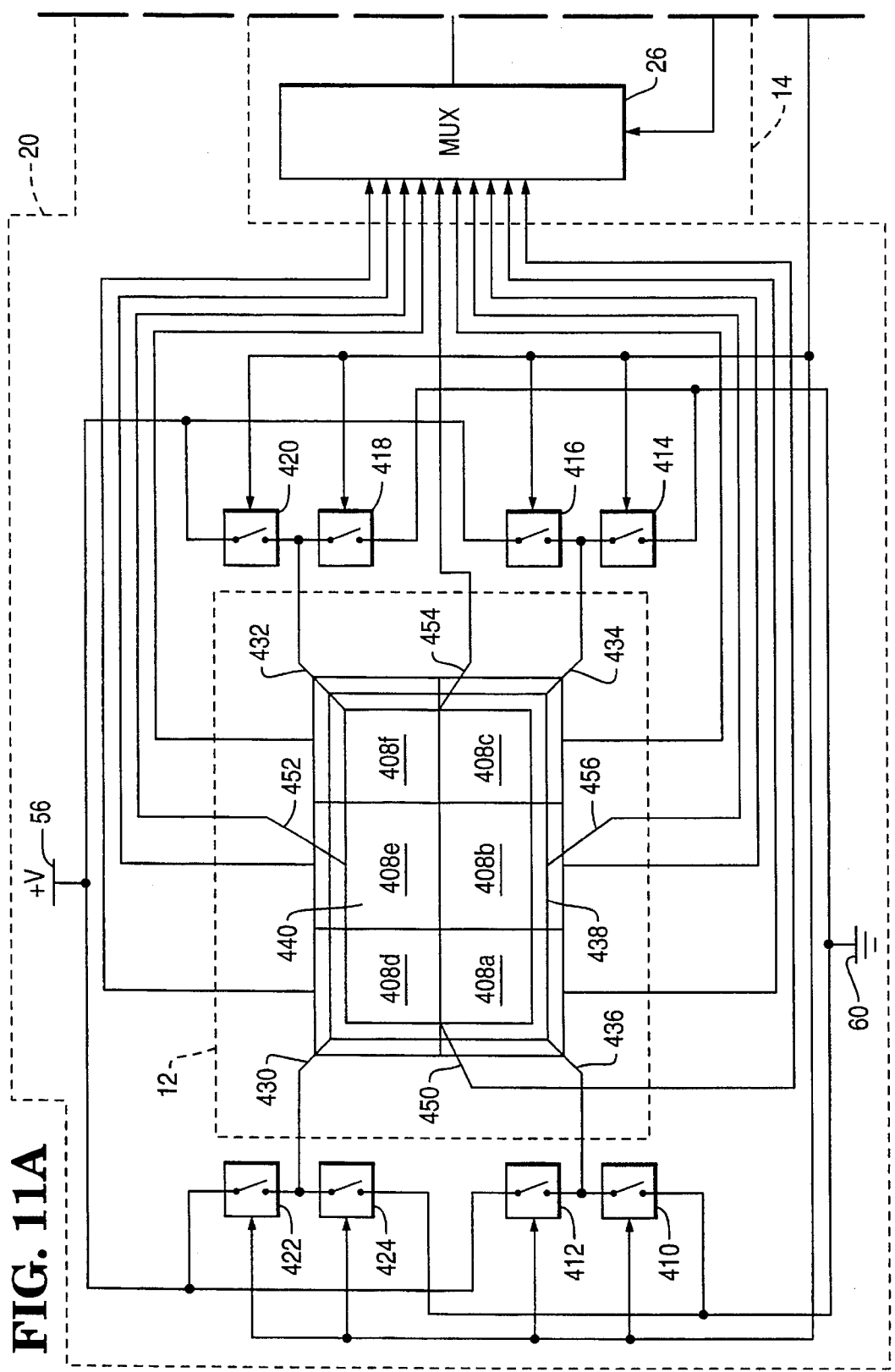
FIGS. 11A and 11B are a schematic diagram of a second embodiment of the system of FIG. 1.
Figure 11B:
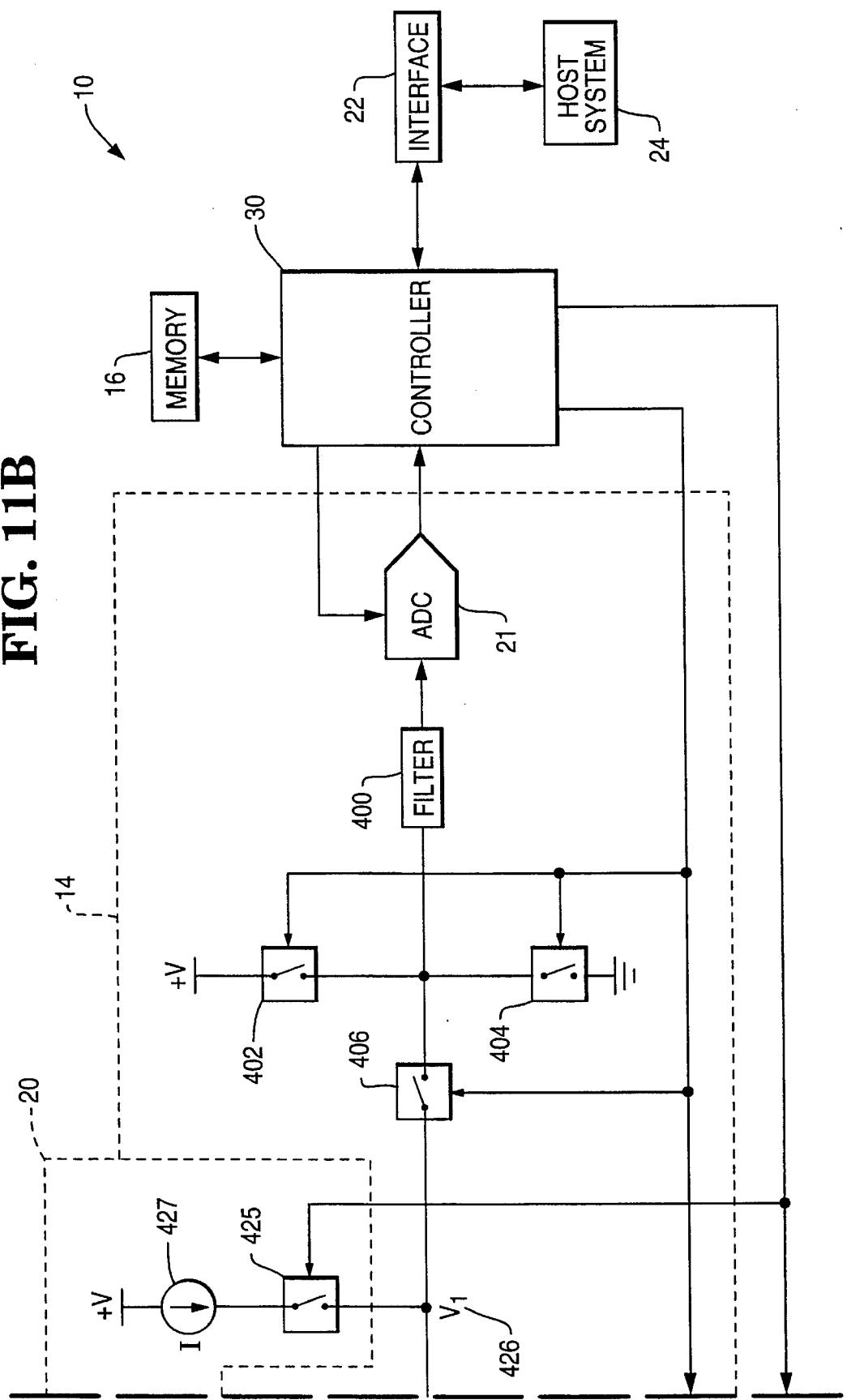

Turning now to FIGS. 11A and 1B, the second embodiment of the system of FIG. 1 is shown in more detail. The second embodiment is based upon a five-wire segmented digitizer. Differences between the four-wire system and the five-wire system are discussed below.

Analog processing circuitry 13 preferably includes multiplexer 26, analog switches 402, 404, and 406, filter 400, and analog-to-digital (A/D) converter 28.

Controller 14 reads the voltages at segments 408a–f through A/D converter 28.

Multiplexer 26 multiplexes signals from segments 408a–f.

A/D converter 28 converts the analog signals from each of segments 408a–f into digital numbers.

Analog processing circuitry 13 also includes filter 400, which removes any electrical noise that might be present from segmented digitizer 12. Filter 400 may be a standard first order filter. Controller 14 may preset the initial conditions for filter 400 using analog switches 402–406.

Drive circuitry 20 includes analog switches 410–424, which apply either voltage source 50, or electrical ground 60 to the corners 414–436 of electrode ring 438, in accordance with instructions from controller 14. Drive circuitry 20 also includes current source 427 and analog switch 425 for selectively applying current I to a given segment 408a–f through multiplexer 26. Analog switches 410–425 are standard single pole, single throw, digitally controlled analog switches.

Figure 12:
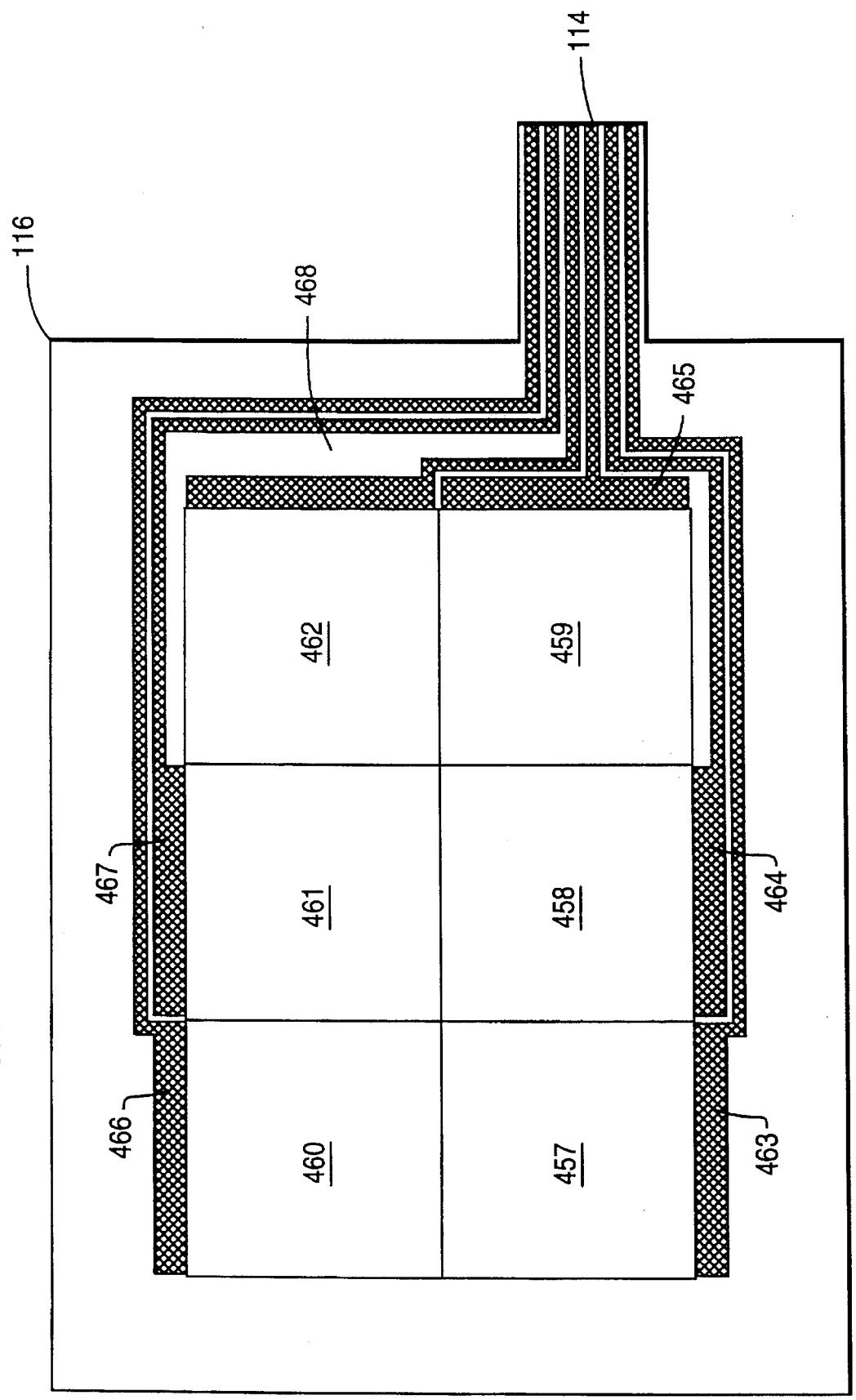
FIG. 12 is a bottom view of the top layer of the segmented digitizer of FIG. 11A and 11B.
Figure 13:
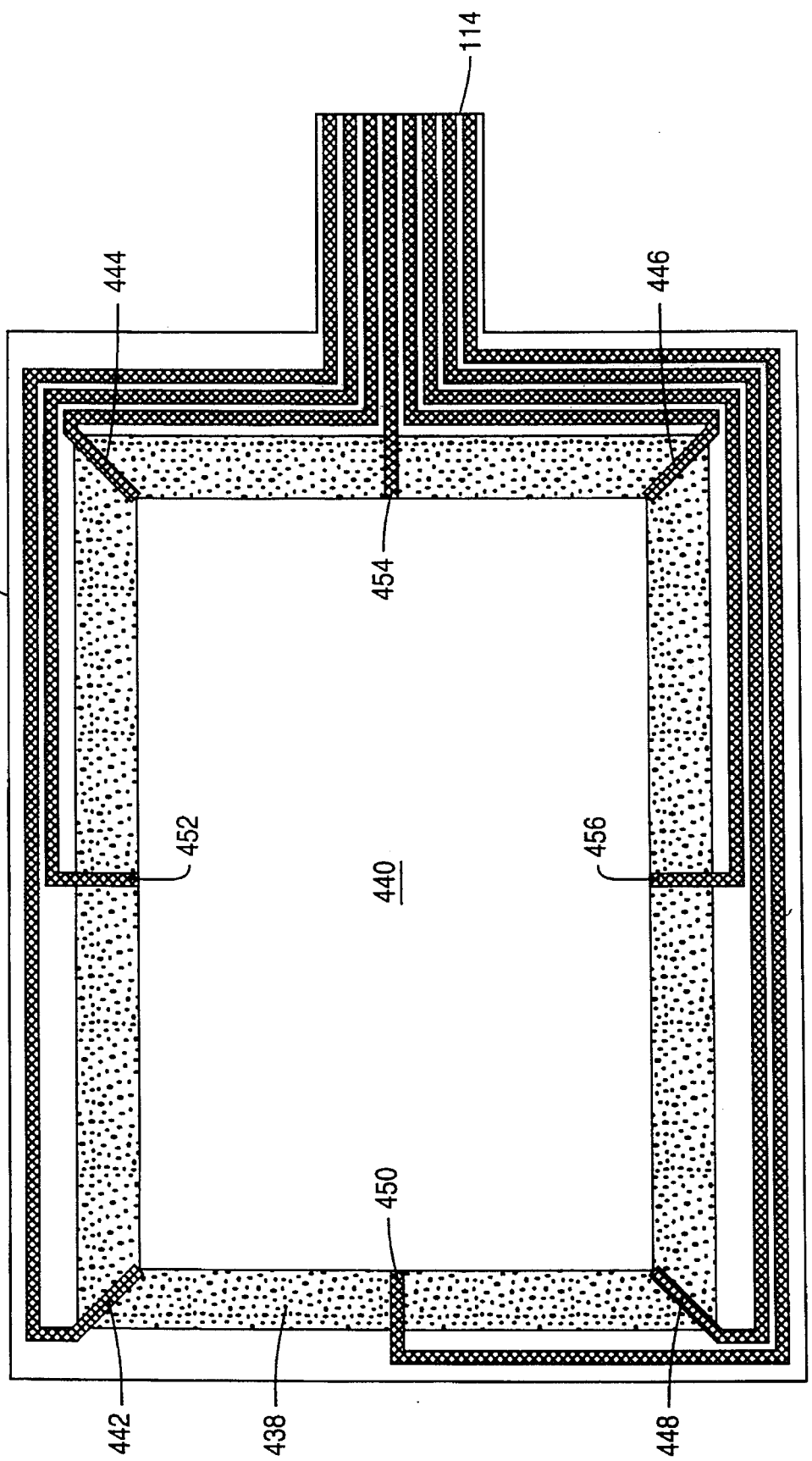
FIG. 13 is a top view of the bottom layer of the segmented digitizer of FIGS. 11A and 11B.

Referring now to now to FIGS. 12 and 13, segmented digitizer 12 is shown as a segmented five wire membrane digitizer. Digitizer 12 includes several layers of polyester and adhesive attached to a rigid substrate. Conductors are silk-screened with silver ink, while various surfaces of digitizer 12 are coated with indium tin oxide (ITO), a transparent conductor. Digitizer 12 connects to other components of circuit 10 via a flat flex connector tail 114. The cross sectional view in FIG. 3 also applies to the segmented five-wire membrane digitizer of FIGS. 12 and 13.

With reference to FIG. 12, top layer 116 is shown in more detail. Top layer 116 includes ITO strips 457–462. Electrodes 463–468 make electrical contact with ITO strips 457–462, respectively.

With reference to FIG. 13, bottom layer 122 is shown in more detail. Bottom layer 122 consists primarily of ITO area 440 surrounded by electrode pattern 438. Electrode pattern 438 is typically a special silk-screened pattern of silver ink, as described in U.S. Pat. No. 4,371,746 to Pepper. This patent is hereby incorporated by reference. Alternatively, it can be a ring of discrete resistors, discrete diodes, spot electrodes, bar electrodes, or a solid band of moderate resistance conductive ink. Silver ink traces 442–448 contact the electrode pattern 438 at its corners.

Calibration sense points 454–456 detect the actual voltage along the edges of ITO area 440. U.S. Pat. No. 4,435,616 by Kley details one way of constructing calibration sense points 450–456. Alternatively, calibration sense points 450–456 could simply contact the midpoints of the electrode pattern detailed in the above mentioned U.S. Pat. No. 4,371,746.

Placement of top layer 116 over bottom layer 122 effectively creates six separate writing areas corresponding to segments 408a–f.

Figure 14:
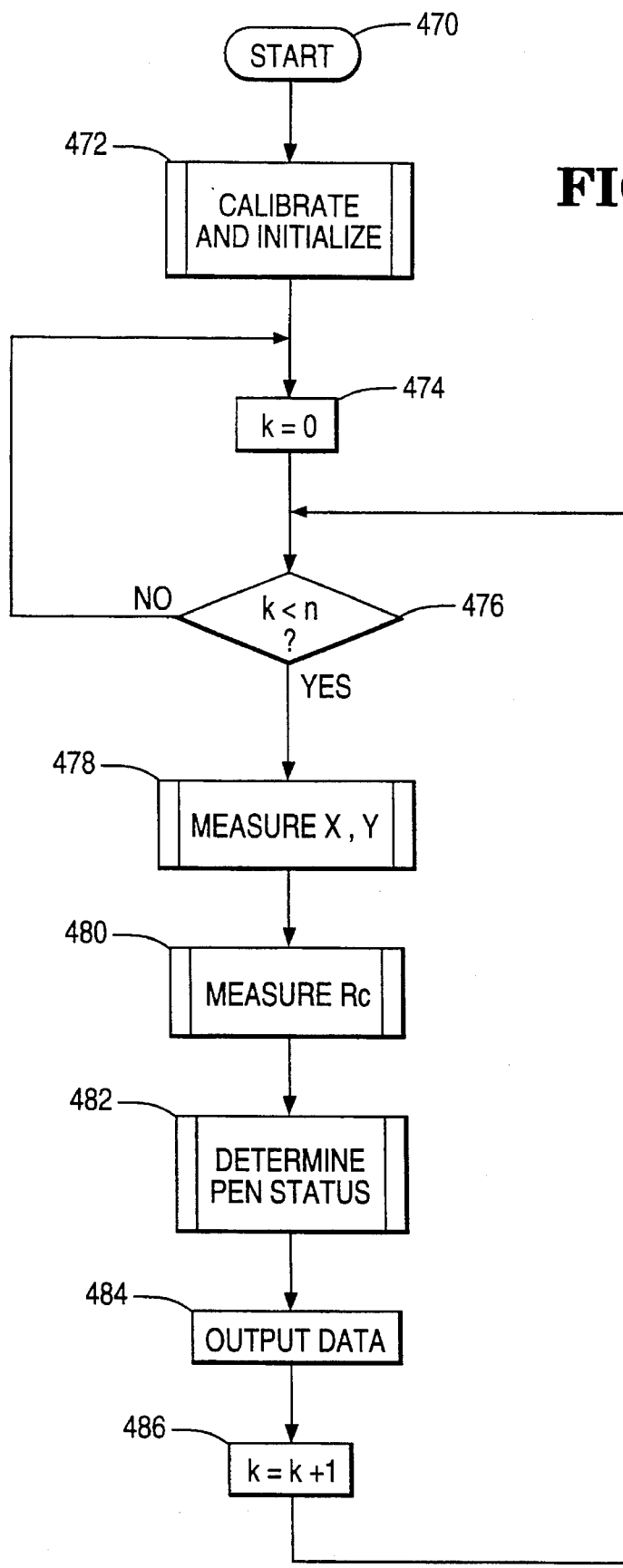
FIG. 14 is a flow diagram of a method for determining the coordinates of a point of contact on the surface of the segmented digitizer in FIGS. 11A and 11B.

Turning now to FIG. 14, a method for determining touch position is disclosed, beginning with START 470. In order to illustrate the general case of an m by n digitizer, ITO strips 457–462 are numbered 0, 1, 2, ..., m·n, starting from the lower left hand corner of the segmented digitizer 12 and moving bottom to top, left to right. Thus, in the digitizer of FIGS. 12–13, ITO strips 457–462 are numbered 0, 1, 2, 3, 4, and 5, respectively.

In step 472, controller 14 performs a calibration and initialization step. Controller 14 then steps through each segment of the digitizer 12 and determines position, contact resistance Rc, and pen status. It does this by first initializing count variable k to 0 in step 474.

In step 476, controller 14 determines whether count variable k is less than the number of segments, m·n. If count variable k is not less than horizontal constant m·n, the procedure returns to step 474. Otherwise, the procedure continues to step 478.

In step 478, controller 14 measures position. In step 480, controller 14 measures contact resistance Rc at the point of actuation.

Using contact resistance Rc and the positional data, controller 14 determines whether the writing instrument is up, down, or in a multipoint condition in step 482.

In step 484, controller 14 outputs contact resistance Rc, pen status, and position to host system 24 via interface 22.

Finally, controller 14 increments count variable k in step 486 and returns to step 476.

Figure 15:
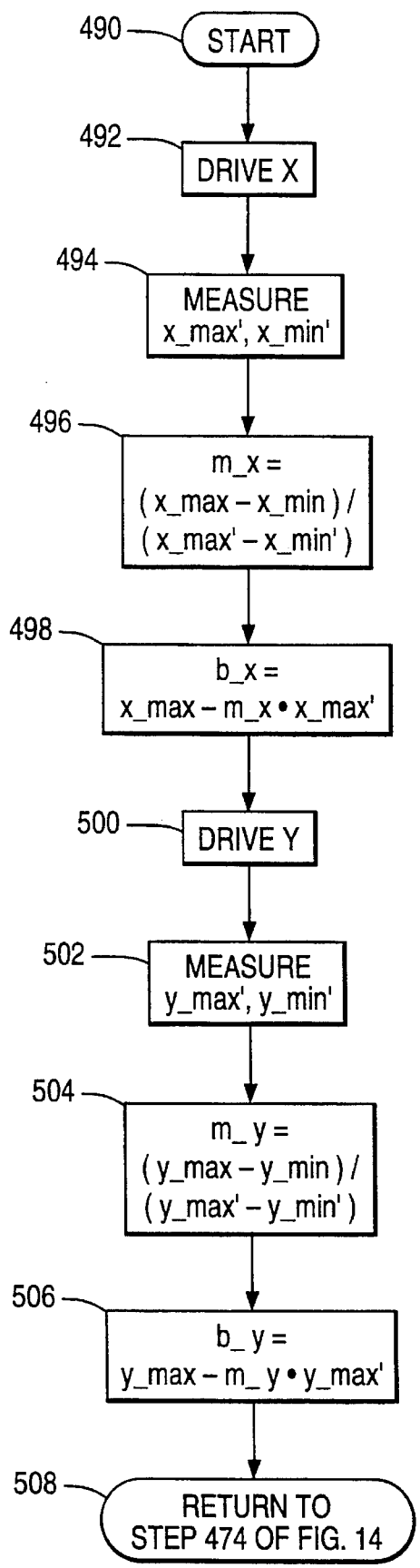
FIG. 15 is a flow diagram of a method for initializing and calibrating the segmented digitizer in FIGS. 11A and 11B.

Turning now to FIG. 15, the calibration and initialization step 472 from FIG. 13 is shown in more detail. The calibration procedure and equations are similar to those of the first embodiment. Good calibration is not as important in the second embodiment because unlike the first embodiment there is no inherent problem with segment mismatch. The calibration and initialization procedure begins at START 490

In step 492, controller 14 drives segmented digitizer 12 in the x-direction. Controller 14 closes switches 406, 424, 410, 416, and 420 while leaving all other switches open. This creates a voltage gradient along back layer 122 of digitizer 12 that increases from left to right.

Next, in step 494, controller 14 measures x_max' and x_min' at calibration sense points 454 and 450 respectively. Controller 14 selects each calibration sense point in turn through multiplexer 26 and reads the resulting value from A/D converter 28.

In step 496, controller 14 calculates the scalar constant m_x using equation (7) from above. Similarly, controller 14 calculates the offset constant b_x in step 498 using equation (8) from above.

In step 500, controller 14 drives segmented digitizer 12 in the y-direction. Controller 14 closes switches 406, 422, 420, 410, and 413 while leaving all other switches open. This creates a voltage gradient along back layer 122 of digitizer 12 that increases from bottom to top.

Next, in step 502 controller 14 measures y_max' and y_min' at calibration sense points 452 and 456 respectively. Controller 14 selects each calibration sense point in turn through multiplexer 26 and reads the resulting value from A/D converter 28.

In step 504, controller 14 calculates the scalar constant m_y using equation (9) from above. Similarly, controller 14 calculates the offset constant b_y in step 506 using equation (10) from above.

Finally, controller 14 returns to step 474 of FIG. 14 in step 508.

Figure 16:
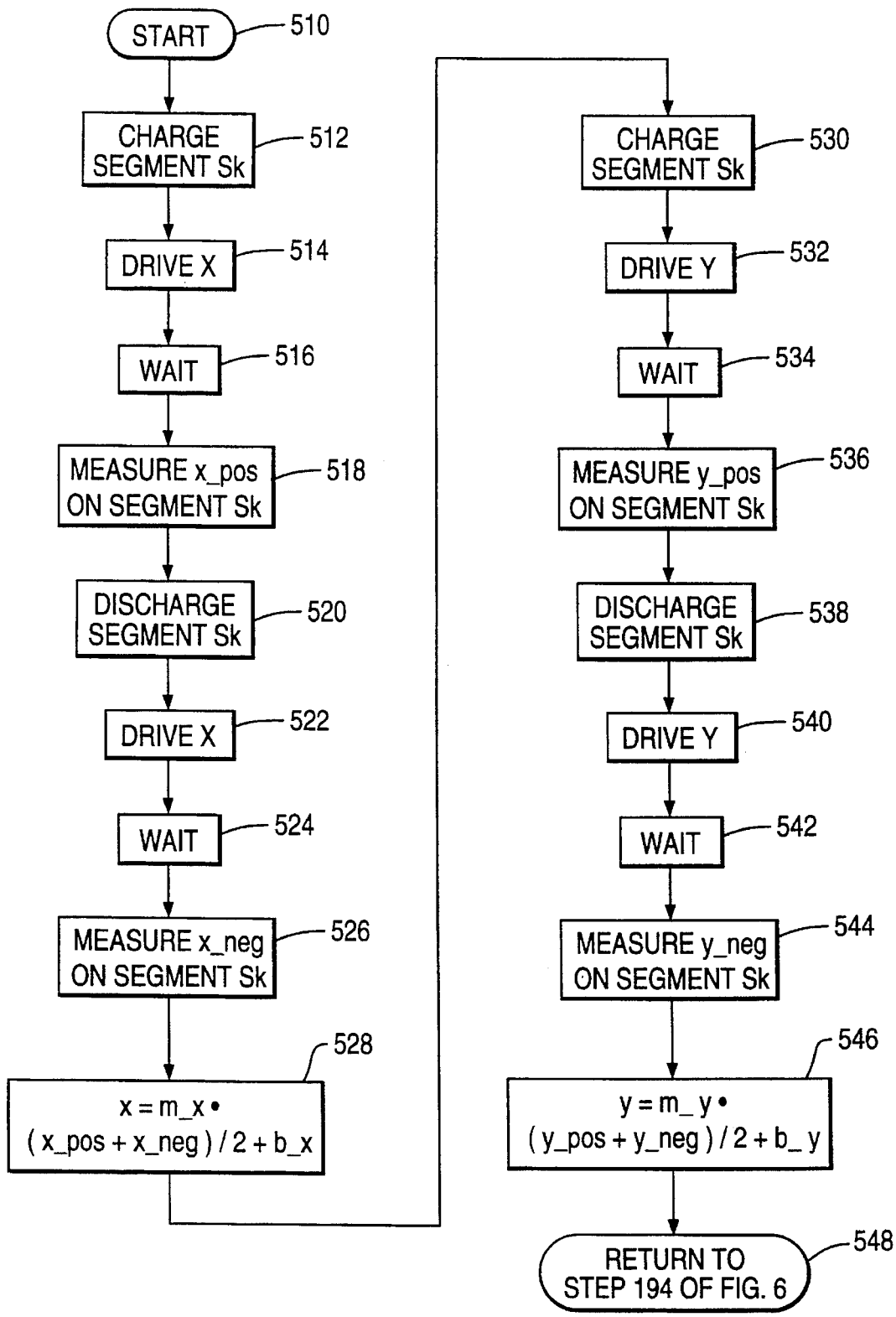
FIG. 16 is a flow diagram of a method for determining contact position in FIGS. 11A and 11B.

Turning now to FIG. 16, the "Measure X, Y" step 478 of FIG. 14 is explained in more detail, beginning with START 510.

In step 512, controller 14 charges ITO strip Sk by applying voltage source 50 to digitizer 12 and low pass filter 400. Controller 14 selects ITO strip Sk (ITO strip 457) through multiplexer 26 and closes switches 402 and 406 for a short period of time while leaving all other switches open.

In step 514, controller 14 drives the segmented digitizer 12 in the x-direction just as in step 492 from FIG. 15.

In step 516, controller 14 waits for ITO strip Sk to discharge to the positional voltage at the point of actuation.

In step 518, controller 14 measures the temporary quantity x_pos at segment Sk. Controller 14 selects ITO strip Sk (ITO strip 457) through multiplexer 26 and measure x_pos at A/D converter 28.

In step 520, controller 14 discharges ITO strip Sk by discharging digitizer 12 andlow pass filter 400. Controller 14 selects ITO strip Sk (ITO strip 457) through multiplexer 26 and closes switches 404 and 406 for a short period of time while leaving all other switches open.

In step 522, controller 14 drives segmented digitizer 12 in the x-direction just as in step 492 from FIG. 15.

In step 524, controller 14 waits, just as in the previous step 516.

In step 526, controller 14 measures x_neg in exactly the same way it measured x_pos in step 518.

In step 528, controller 14 calculates position by applying the calibration mapping function (equation (1) above) to the average of x_pos and x_neg. The exact equation is $$x = m\_x(x\_pos + x\_neg) \div 2 + b\_x.$$

In step 514, controller 14 charges ITO strip Sk just as in previous step 512.

In step 532, controller 14 drives the segmented digitizer 12 in the y-direction just as in step 500 from FIG. 15.

In step 534, controller 14 waits, just as in the previous step 516.

In step 536, controller 14 measures the temporary quantity y_pos at ITO strip Sk using the same procedure as in the previous step 518.

In step 538, controller 14 charges ITO strip Sk just as in previous step 512.

In step 540, controller 14 drives the segmented digitizer 12 in the y-direction just as in step 500 from FIG. 15.

In step 542, controller 14 waits, just as in the previous step 516.

In step 544, controller 14 measures the temporary quantity y_neg at ITO strip Sk using the same procedure as in the previous step 526.

In step 546, controller 14 calculates position by applying the calibration mapping function (equation (2) above) to the average of y_pos and y_neg using the equation $$y = m\_y(y\_pos + y\_neg) + b\_y.$$

Finally, in step 548, the procedure ends by returning to step 480 of FIG. 14.

Figure 17:
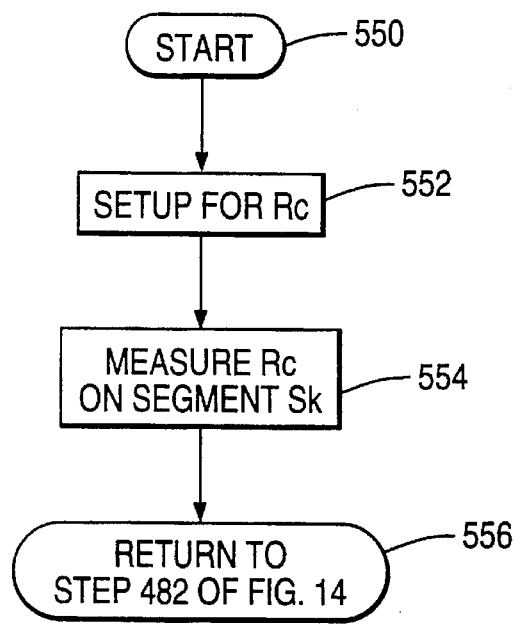
FIG. 17 is a flow diagram of a method for determining contact resistance in FIGS. 11A and 11B.

Turning now to FIG. 17, the method of determining contact resistance Rc is discussed in detail, beginning with START 550.

In step 552, controller 14 selects ITO strip Sk through multiplexer 26 and closes switches 406, 425, 410, 424, 418, and 414 while leaving all other switches open. This grounds all corners of the electrode pattern 438 through silver ink traces 442–448 and injects a constant current I from current source 427 into ITO strip Sk through multiplexer 26.

In step 554, controller 14 actually measures the resulting contact resistance Rc for segment Sk at A/D converter 28.

In step 556, controller 14 returns to step 482 in FIG. 14.

Figure 19:
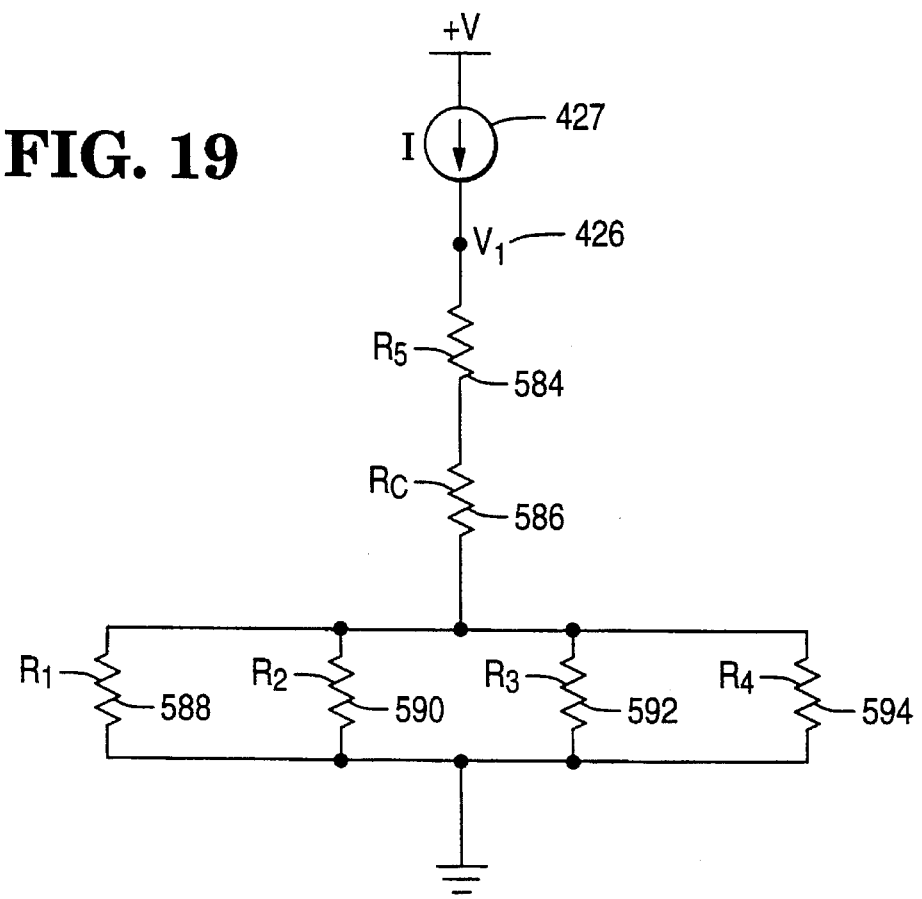
FIG. 19 is a schematic diagram illustrating how contact resistance is measured in the second embodiment of the system of FIG. 1.

Turning now to FIG. 19, a schematic representation of digitizer 22 is shown, depicting the digitizer drive circuitry 20 as it is set in step 552 of FIG. 17. Resistors 588–594 represent the resistances from the point of actuation on bottom digitizer layer 122 to each corner 414–436 of electrode pattern 438 respectively. Resistance 584 represents the resistance from the point of actuation on ITO strip Sk to the corresponding segment Sk electrode. Voltage V1 is the voltage at the output of multiplexer 26.

If the parallel combination of resistances R1–R4 is much less than contact resistance Rc, and if resistance R5 is much less than contact resistance Rc, then V1 is approximately equal to the product I·Rc. If current I is constant, voltage V1 is directly proportional to contact resistance Rc. Because controller 14 is not concerned with the absolute resistance, it can treat voltage V1 as if it were contact resistance Rc, even though it is only proportional to contact resistance Rc.

Figure 18:
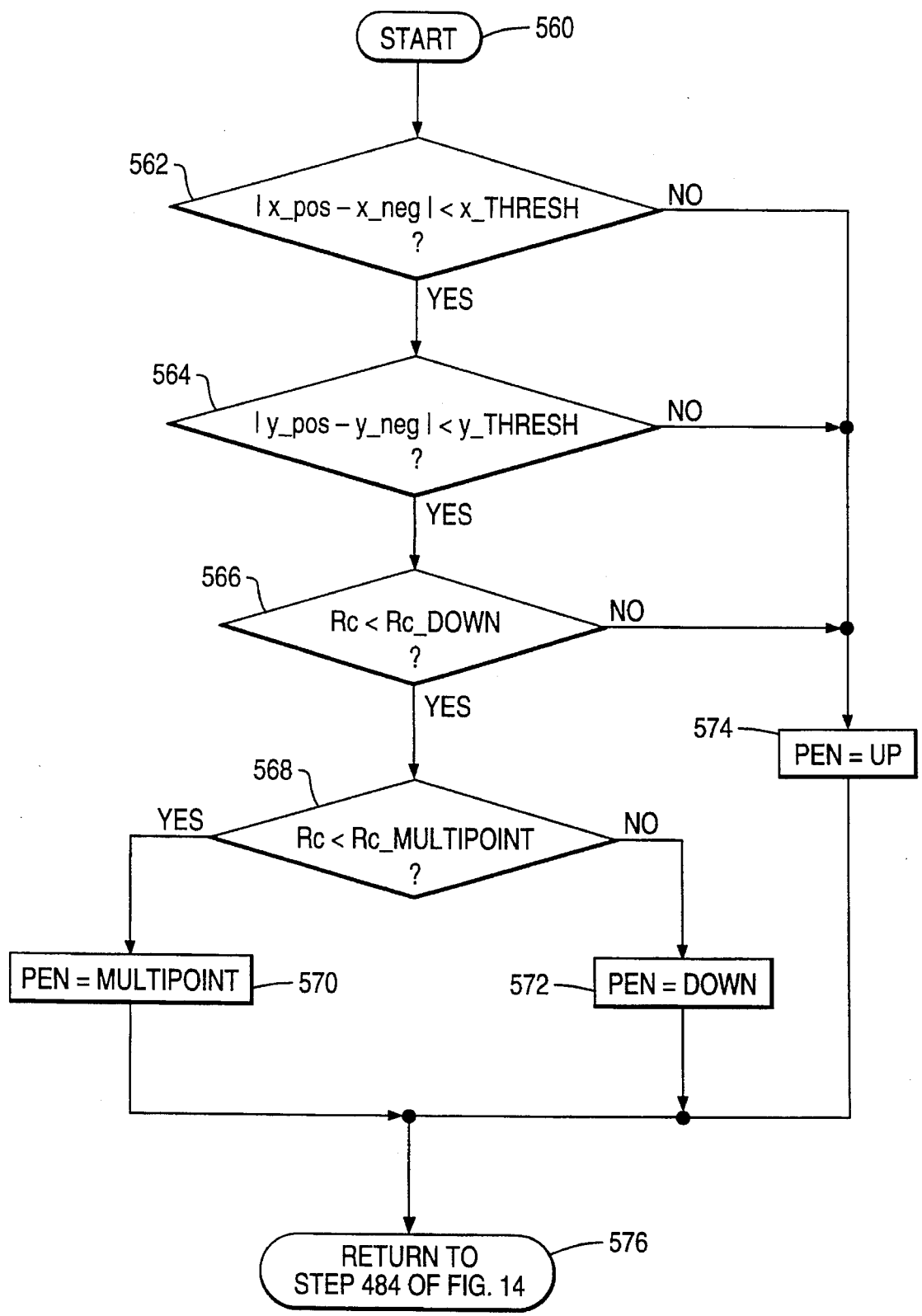
FIG. 18 is a flow diagram of a method for determining pen status in FIGS. 11A and 11B.

Turning now to FIG. 18, the method of determining pen status is explained in detail, beginning with START 560. Controller 14 determines pen status according to a combination of contact resistance Rc, x_pos, x_neg, y_pos, and y_neg.

In step 562, controller 14 determines whether the absolute value of the difference between x_pos and x_neg is less than x_thresh, where x_thresh is a threshold constant typically on the order of four counts for a 10-bit A/D converter. If decision step 562 is not true, then the x coordinate is not stable and operation continues to step 574 where controller 14 sets the pen status to UP, meaning a stylus or finger is not contacting digitizer 12. After step 574, operation returns in step 576 to step 484 of FIG. 14.

Returning to step 562, if the absolute value of x_pos minus x_neg is less than x_thresh, the procedure continues to step 564 where controller 14 determines whether the absolute value of y_pos minus y_neg is less than y_thresh.

Again, y_thresh is a threshold constant typically on the order of four counts for a 10-bit A/D converter. If this is not true, the y-coordinate is not stable and execution continues at step 574. Otherwise, execution continues to step 566 where controller 14 determines whether contact resistance Rc is less than threshold constant Rc_down. Threshold constant Rc_down is typically on the order of 90% of the full scale contact resistance Rc reading.

If contact resistance Rc is not less than threshold constant Rc_down, then execution continues to step 574. Otherwise, execution continues to step 568 where controller 14 determines whether contact resistance Rc is less than threshold constant Rc_multipoint. Rc_multipoint is typically on the order of 10% of the full scale contact resistance Rc reading.

If contact resistance Rc is less than threshold constant Rc_multipoint, then execution continues to step 570 where controller 14 sets the pen status to MULTIPOINT. Therefore, a user is touching digitizer 12 with a finger.

Returning to step 568, if contact resistance Rc is not less than threshold constant Rc_multipoint, controller 14 sets the pen status to DOWN in step 572. Therefore, only a stylus is actuating digitizer 12. In either case 570 or 572, execution continues to step 576 where the procedure returns to step 484 of FIG. 14.

Although the present invention has been described with particular reference to certain preferred embodiments thereof, variations and modifications of the present invention can be effected within the spirit and scope of the following claims.

What is claimed is:

1. A digitizer input system comprising:
    a segmented digitizer, including
        a first layer having a plurality of groups of adjacent conductive strips, wherein the conductive strips are electrically isolated from each other and generally oriented in a first direction, and wherein each group of conductive strips is electrically isolated from any other group of conductive strips;
        a second layer adjacent the first layer having a number of groups of adjacent conductive strips, wherein the conductive strips are electrically isolated from each other and generally oriented in a second direction different than the first direction, and wherein each group of conductive strips in the second layer is electrically isolated from any other group of conductive strips in the second layer; and
        a spacer between the first and second layers;
    circuitry which processes information entered into at least one of the segments of the segmented digitizer; and
    a controller which determines position coordinates associated with the information.

2. A digitizer input system comprising:
    a digitizer device including
        a segmented digitizer including a plurality of segments formed from a first layer having a plurality of electrically isolated groups of adjacent conductive strips, a second layer having a number of electrically isolated groups of adjacent conductive strips, and a plurality of spacers between the first and second layer;
        wherein the segmented digitizer further includes a drive electrode for each conductive strip of the first and second layers, and a sense electrode for at least one conductive strip of either the first and second layers;
        wherein the conductive strips of each of the groups of the first layer are electrically isolated from each other and from any other group in the first layer and generally oriented in a first direction;

wherein the conductive strips of each of the groups of the second layer are electrically isolated from each other and from any other group in the second layer and generally oriented in a second direction substantially orthogonal to the first direction; and wherein the number of segments is equal to the number of groups in the first layer multiplied by the number of groups in the second layer;

circuitry coupled to the sense electrodes which processes information entered into one or more segments of the segmented digitizer;

a controller which determines position coordinates associated with the information; and circuitry coupled between the controller and the drive electrodes of the segmented digitizer which drives and calibrates the segmented digitizer including at least one electrical source, and a plurality of switches controlled by the controller for selectively coupling the source to predetermined drive electrodes;

a host computer system coupled to the controller so that the controller can upload positional coordinates to the host system; and an interface between the controller and the host system.

3. A digitizer input device comprising:

a segmented digitizer, including a first layer having a plurality of groups of adjacent conductive strips, wherein the conductive strips are electrically isolated from each other and generally oriented in a first direction, and wherein each group of conductive strips is electrically isolated from any other group of conductive strips;

a second layer adjacent the first layer having a number of groups of adjacent conductive strips, wherein the conductive strips are electrically isolated from each other and generally oriented in a second direction different than the first direction, and wherein each group of conductive strips in the second layer is electrically isolated from any other group of conductive strips in the second layer; and a spacer between the first and second layers;

circuitry which processes information entered into at least one of the segments of the segmented digitizer; and a controller which determines position coordinates associated with the information.

4. A segmented digitizer comprising:

a plurality of segments formed by the combination of a first layer having a plurality of electrically isolated groups of adjacent conductive strips, a second layer having a number of electrically isolated groups of adjacent conductive strips, and a plurality of spacers between the first and second layers;

wherein the conductive strips of each of the groups of the first layer are electrically isolated from each other and from any other group in the first layer and generally oriented in a first direction;

wherein the conductive strips of each of the groups of the second layer are electrically isolated from each other and from any other group in the second layer and generally oriented in a second direction substantially orthogonal to the first direction; and wherein the number of segments is equal to the number of groups in the first layer multiplied by the number of groups in the second layer.

5. A digitizer input device comprising:

a segmented digitizer including a plurality of segments formed from the combination of a first layer having a plurality of electrically isolated groups of adjacent conductive strips, a second layer having a number of electrically isolated groups of adjacent conductive strips, and a plurality of spacers between the first and second layers;

wherein the segmented digitizer further includes a drive electrode for each conductive strip of the first and second layers, and a sense electrode for at least one conductive strip of either the first and second layers;

wherein the conductive strips of each of the groups of the first layer are electrically isolated from each other and from any other group in the first layer and generally oriented in a first direction;

wherein the conductive strips of each of the groups of the second layer are electrically isolated from each other and from any other group in the second layer and generally oriented in a second direction substantially orthogonal to the first direction; and wherein the number of segments is equal to the number of groups in the first layer multiplied by the number of groups in the second layer;

circuitry coupled to the sense electrodes which processes information entered into one or more segments of the segmented digitizer;

a controller which determines position coordinates associated with the information; and circuitry coupled between the controller and the drive electrodes of the segmented digitizer which drives and calibrates the segmented digitizer including at least one electrical source, and a plurality of switches controlled by the controller for selectively coupling the source to predetermined drive electrodes.

6. A segmented digitizer comprising:

a first layer including a plurality of electrically isolated groups of adjacent conductive strips generally oriented in a first direction; and a second layer adjacent the first layer including a number of electrically isolated groups of adjacent conductive strips generally oriented in a second direction substantially orthogonal to the first direction;

wherein the first and second layers combine to form a number of segments equal to the number of groups in the first layer multiplied by the number of groups in the second layer.

* * * * *